(12) United States Patent
Arai et al.

(10) Patent No.: US 8,463,513 B2
(45) Date of Patent: Jun. 11, 2013

(54) TRANSMISSION CONTROL APPARATUS

(75) Inventors: Dai Arai, Wako (JP); Hiroyuki Kojima, Wako (JP); Yoshiaki Nedachi, Wako (JP); Masataka Tanaka, Wako (JP); Shigeru Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 13/036,011

(22) Filed: Feb. 28, 2011

(65) Prior Publication Data

US 2011/0218720 A1 Sep. 8, 2011

(30) Foreign Application Priority Data

Mar. 3, 2010 (JP) ................................. 2010-046463

(51) Int. Cl.
*G06F 7/00* (2006.01)
(52) U.S. Cl.
USPC ............................................. 701/55; 701/59
(58) Field of Classification Search
USPC ...................................................... 701/55, 59
See application file for complete search history.

(56) References Cited

U.S. PATENT DOCUMENTS

| | | | |
|---|---|---|---|
| 5,549,519 A | 8/1996 | Seidel et al. | |
| 6,793,027 B1 * | 9/2004 | Yamada et al. | 180/65.1 |
| 6,823,954 B2 * | 11/2004 | Shimabukuro et al. | 180/65.25 |
| 7,223,200 B2 * | 5/2007 | Kojima et al. | 477/3 |
| 7,282,008 B2 * | 10/2007 | Oshidari | 477/4 |
| 2007/0186705 A1 | 8/2007 | Suzuki | |
| 2008/0119975 A1 * | 5/2008 | Yamazaki et al. | 701/22 |
| 2008/0305927 A1 | 12/2008 | Gierling et al. | |
| 2009/0248265 A1 * | 10/2009 | Tabata et al. | 701/59 |

FOREIGN PATENT DOCUMENTS

| | | |
|---|---|---|
| EP | 1767823 | 3/2007 |
| JP | 01-279150 | 11/1989 |
| JP | 2007-218269 | 8/2007 |

OTHER PUBLICATIONS

European Office Action for corresponding EP Application No. 11154826.9-1254, Oct. 25, 2011.

\* cited by examiner

*Primary Examiner* — Hussein A. Elchanti
(74) *Attorney, Agent, or Firm* — Ditthavong Mori & Steiner, P.C.

(57) ABSTRACT

A transmission control apparatus for an automatic transmission to change a shift position automatically includes a cornering-state judging device, a modified shift-up table generator, and a gear-shift controller. The cornering-state judging device is configured to judge whether a vehicle has transitioned to a cornering state from a normal running state. The modified shift-up table generator is configured to generate a modified shift-up table when the vehicle is judged to have transitioned to the cornering state. The modified shift-up table makes a shift-up more difficult to occur than a reference shift-up table does. The gear-shift controller is configured to perform gear-shift control by using the reference shift-up table during the normal running state. The gear-shift controller is configured to suppress a gear shift by using the modified shift-up table instead of the reference shift-up table when the vehicle is judged to have transitioned to the cornering state.

15 Claims, 18 Drawing Sheets

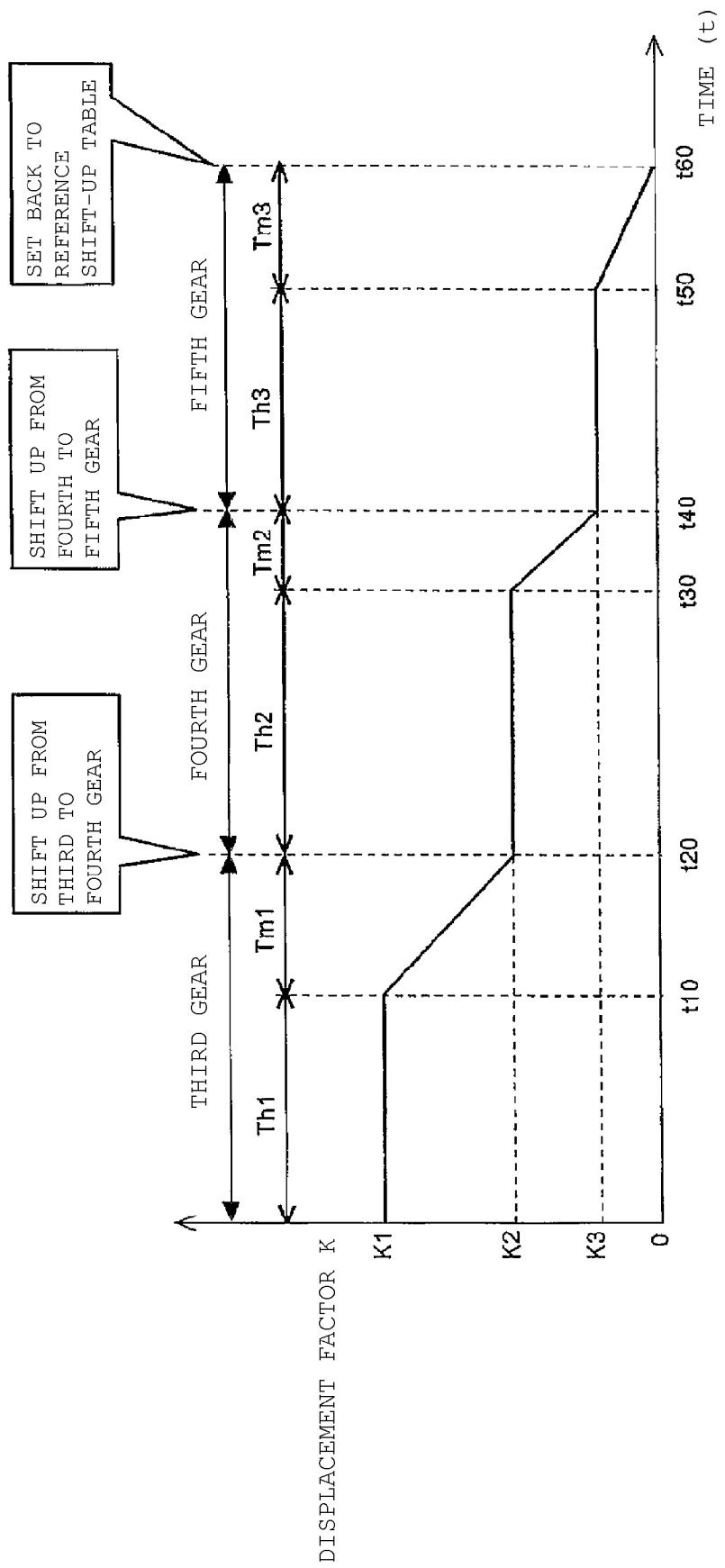

TRANSMISSION CONTROL APPARATUS

CROSS-REFERENCE TO RELATED APPLICATIONS

The present application claims priority under 35 U.S.C. §119 to Japanese Patent Application No. 2010-046463, filed Mar. 3, 2010. The contents of this application are incorporated herein by reference in their entirety.

BACKGROUND OF THE INVENTION

1. Field of the Invention

The present invention relates to a transmission control apparatus.

2. Discussion of the Background

There are transmission control devices for automatic transmissions that automatically or semi-automatically select the most suitable shift position on the basis of information on the vehicle speed, the engine speed, the throttle opening, and the like. For such transmission control devices, a configuration has heretofore been known in which under a given circumstance, the gear-shift condition is made different from that in a normal running state.

Japanese Patent Application Publication No. 2007-218269 discloses a transmission control device for an automatic transmission used in a motorcycle. Specifically, the transmission control device obtains the lateral lean angle (bank angle) of the vehicle body through detection with a lean angle sensor or through calculation of the vehicle speed and the steering angle. Then, while the lean angle is above a predetermined value, the transmission control device assumes that the motorcycle is turning (in cornering state), and performs no gear-shift control even if a gear shift condition is met.

However, the technique described in Japanese Patent Application Publication No. 2007-218269 is one that simply inhibits gear shift operation while the bank angle of the vehicle body is above a predetermine value, and does not take into consideration the performing of gear-shift control according to various cornering states that differ from one another in vehicle speed, bank angle, and the like. In conventional practices, an expensive sensor such as a bank angle sensor or a gyroscope is needed to determine the cornering state. However, use of such a sensor in a motorcycle is sometimes difficult. Thus, it has been desired to determine the cornering state with an inexpensive system using no expensive sensor.

SUMMARY OF THE INVENTION

According to one aspect of the present invention, a transmission control apparatus for an automatic transmission to change a shift position automatically includes a cornering-state judging device, a modified shift-up table generator, and a gear-shift controller. The cornering-state judging device is configured to judge whether a vehicle has transitioned to a cornering state from a normal running state. The modified shift-up table generator is configured to generate a modified shift-up table when the vehicle is judged to have transitioned to the cornering state. The modified shift-up table makes a shift-up more difficult to occur than a reference shift-up table does. The gear-shift controller is configured to perform gear-shift control by using the reference shift-up table during the normal running state. The gear-shift controller is configured to suppress a gear shift by using the modified shift-up table instead of the reference shift-up table when the vehicle is judged to have transitioned to the cornering state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18 is a time chart showing a flow of control to set the modified shift-up table back to the reference shift-up table.

DESCRIPTION OF THE EMBODIMENTS

Figure 1:
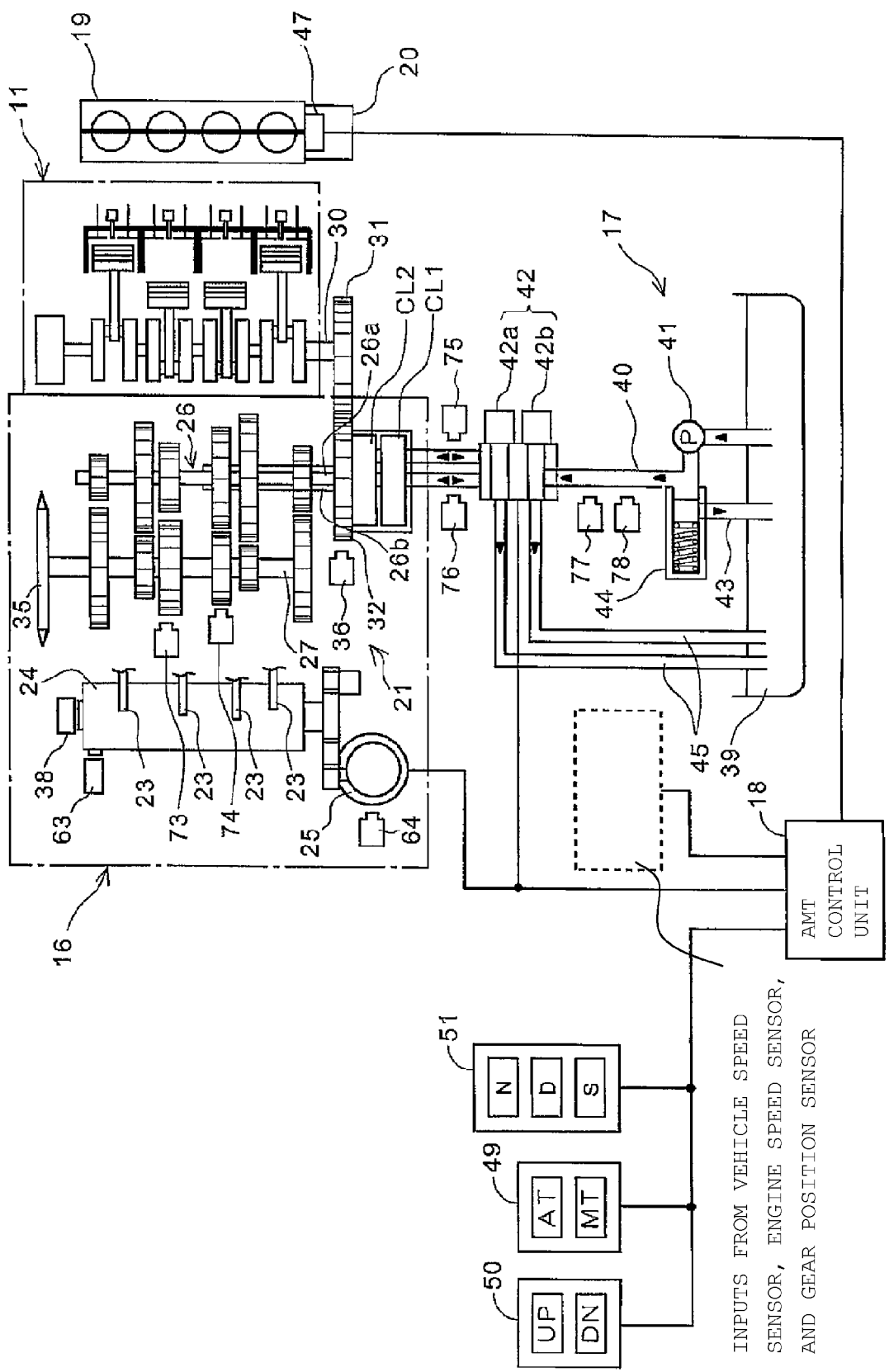
FIG. 1 is a system configuration diagram of an AMT and its peripheral devices according to an embodiment of the present invention.
Figure 2:
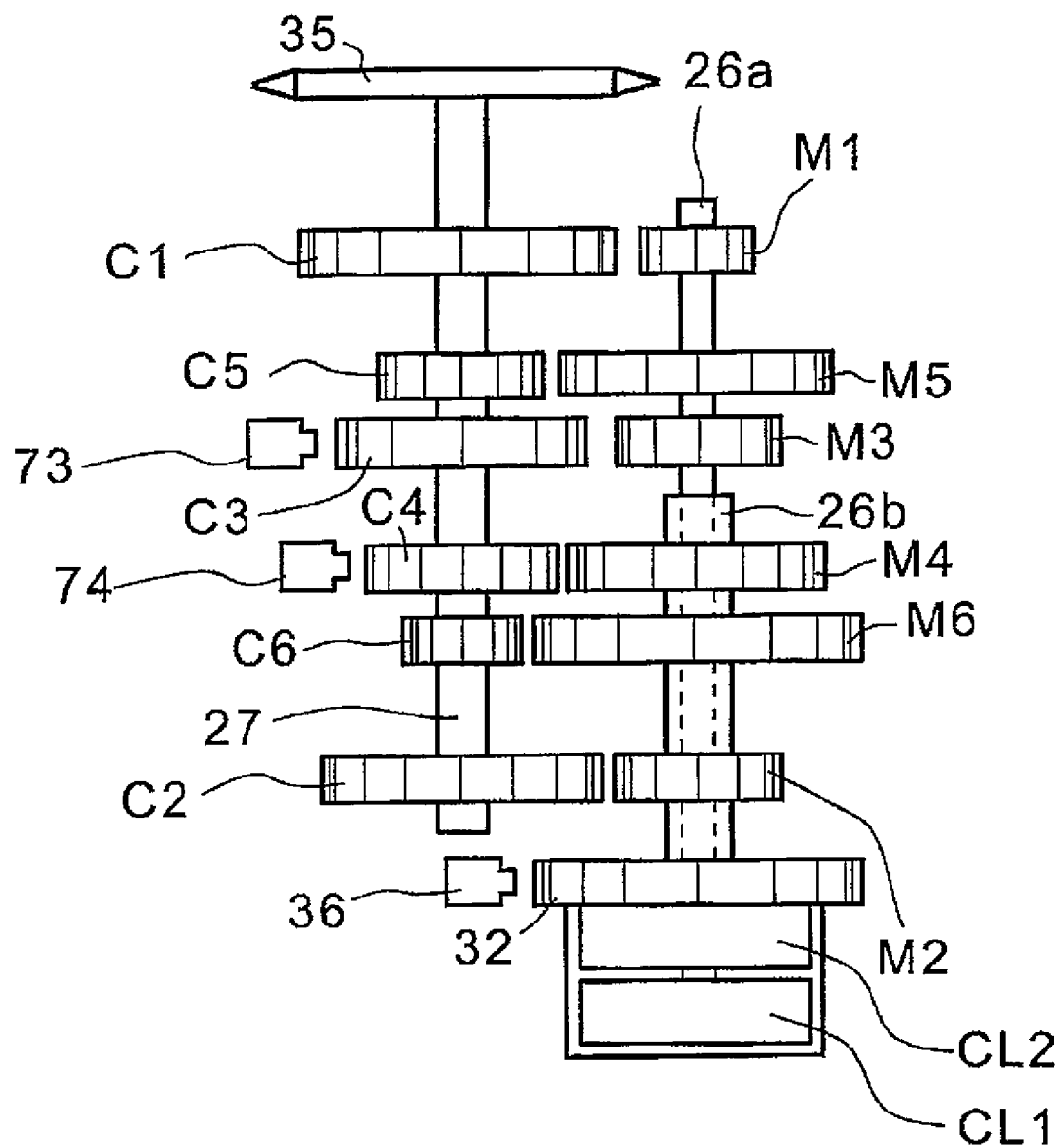
FIG. 2 is an arrangement relationship diagram showing an engagement relation between shafts and speed-shift gears in the AMT.

Hereafter, the embodiments of the present invention will be described in detail with reference to the accompanying drawings, wherein like reference numerals designate corresponding or identical elements throughout the various drawings. FIG. 1 is a system configuration diagram of an automatic manual transmission (hereinafter, AMT) 16 and its peripheral devices the AMT used as an automatic transmission in a motorcycle. FIG. 2 is an arrangement relationship diagram showing an engagement relation between shafts and speed-shift gears in the AMT 16. The AMT 16 is a twin clutch type transmission device which connects and disconnects a rotational driving force of an engine with two clutches disposed on a main shaft. The AMT 16 connected to an engine 11 is drive-controlled by a clutch hydraulic device 17 and an AMT control unit 18 serving as a transmission control device. The engine 11 has a throttle body 19 of a throttle-by-wire type, and the throttle body 19 is provided with a motor 20 for opening and closing the throttle.

The AMT 16 includes a transmission 21 of six forward speed-shift gears, a first clutch CL1, a second clutch CL2, a shift drum 24, and a shift control motor 25 which rotates the shift drum 24. A large number of gears which constitute the transmission 21 are joined to or loosely fitted with a main shaft 26 and a counter shaft 27. The main shaft 26 includes an inner main shaft 26a and an outer main shaft 26b. The inner main shaft 26a is joined to the first clutch CL1, and the outer main shaft 26b is joined to the second clutch CL2. Each of the main shaft 26 and the counter shaft 27 is provided with the speed-shift gears which can be freely displaced in an axial direction of the main shaft 26 and in an axial direction of the counter shaft 27. End portions of shift forks 23 are engaged with the speed-shift gears and a guide groove (not shown) formed in the shift drum 24.

A primary drive gear 31 is joined to an output shaft of the engine 11, i.e., a crankshaft 30, and this primary drive gear 31 is engaged with a primary driven gear 32. The primary driven gear 32 is connected to the inner main shaft 26a via the first clutch CL1, and is connected to the outer main shaft 26b via the second clutch CL2. The AMT 16 includes an inner-main-shaft rotational speed sensor 73 and an outer-main-shaft rotational speed sensor 74 which detect rotational speeds of the inner main shaft 26a and the outer main shaft 26b, respectively, by measuring the rotational speeds of predetermined speed-shift gears on the counter shaft 27.

A driving sprocket 35 is joined to the counter shaft 27, and a driving force is transmitted to a rear wheel serving as a drive wheel, via a drive chain (now shown) which is wound around this driving sprocket 35. The AMT 16 is provided with: an engine speed sensor 36 which is disposed so as to face an outer circumference of the primary driven gear 32; a gear position sensor 38 which detects a current gear stage on the basis of the rotation position of the shift drum 24; a shifter sensor 64 which detects a rotation position of a shifter that is driven by the shift control motor 25; and a neutral switch which detects that the shift drum 24 is at a neutral position. Furthermore, a throttle opening sensor 47 which detects a throttle opening is provided in the throttle body 19.

The clutch hydraulic device 17 has a structure which allows interchangeable use of a lubricant oil of the engine 11 and a hydraulic fluid for driving the clutch CL. The clutch hydraulic device 17 includes an oil tank 39, and a pipe line 40 for supplying and feeding the oil (hydraulic fluid) in this oil tank 39 to the first clutch CL1 and the second clutch CL2. On the pipe line 40, a hydraulic pump 41 serving as an oil pressure supply source and a valve (electronic control valve) serving as a motor-driven actuator are provided. On a return pipe line 43 which is connected to the pipe line 40, a regulator 44 is disposed which maintains the pressure of an oil supplied to the valve 42 at a constant value. The valve 42 has such a structure as to be able to apply the oil pressure to the first clutch CL1 and the second clutch CL2 individually. The valve 42 is also provided with a return pipe line 45 of oil.

A pipe line which connects a first valve 42a to the first clutch CL1 is provided with a first-clutch-oil-pressure sensor 75 which measures an oil pressure generated in the first clutch CL1. Similarly, a pipe line which connects a second valve 42b to the second clutch CL2 is provided with a second-clutch-oil-pressure sensor 76 which measures an oil pressure generated in the second clutch CL2.

The AMT control unit 18 is connected to a mode switch 49, a shift select switch 50, and a neutral select switch 51. The mode switch 49 is used for switching between an automatic transmission (AT) mode and a manual transmission (MT) mode, the shift select switch 50 indicates shift-up (UP) or shift-down (DN), and the neutral select switch 51 is used for switching between a neutral (N) mode and a drive (D) mode. The AMT control unit 18 includes a central processing unit (CPU), and is capable of controlling the valve 42 serving as an actuator and the shift control motor 25 in response to the output signals from the above-described respective sensors and switches, and of switching the gear stage of the AMT 16 automatically or semi-automatically. In addition, the AMT control unit 18 according to the present embodiment is configured to be able to select a D (drive) mode or an S (sport) mode while the automatic transmission (AT) mode is selected. The D (drive) mode is excellent in quietness and fuel saving and thus suitable for cruising and the like. The S (sport) mode, in contrast, allows a greater engine speed for gear shift to provide a rapid acceleration. Through the neutral select switch 51, the mode can be switched from the neutral (N) to the D (drive) mode and further to the S (sport) mode from the D (drive) mode.

The AMT control unit 18 switches the gear stage automatically according to information, such as the vehicle speed, the engine speed, and the throttle opening, when the AT mode is selected. On the other hand, the AMT control unit 18 shifts up or shifts down the transmission 21 with operation of the shift select switch 50, when the MT mode is selected. Furthermore, even when the MT mode is selected, an auxiliary automatic transmission control can be performed for preventing an over-speed and a stall of the engine. Note that regardless of whether the automatic transmission (AT) mode is selected or the semi-automatic transmission (MT) mode is selected, the AMT control unit 18 performs connection control including half-clutch control so that the drive power can be transmitted smoothly when the vehicle moves from standstill.

In the clutch hydraulic device 17, an oil pressure is applied to the valve 42 by the hydraulic pump 41, and this oil pressure is controlled by the regulator 44 so that the oil pressure may not exceed an upper limit value. When the valve 42a or the valve 42b is opened by the command from the AMT control unit 18, the oil pressure is applied to the first clutch CL1 or the second clutch CL2, and the primary driven gear 32 is connected to the inner main shaft 26a or the outer main shaft 26b via the first clutch CL1 or the second clutch CL2. On the other hand, when the valve is closed and the application of the oil pressure is stopped, the first clutch CL1 and the second clutch CL2 are biased, by return springs (now shown) incorporated therein, in such a direction that their connection to the inner main shaft 26a and the outer main shaft 26b are cut off.

The valve 42 which drives the clutch by opening and closing the pipe lines connecting the pipe line 40 to both of the clutches CL1 and CL2 is configured to allow the AMT control unit 18 to change arbitrarily the time period or the like from a full close state to a full open state of the pipe line, on the basis of a drive signal.

The shift control motor 25 rotates the shift drum 24 according to the command from the AMT control unit 18. When the shift drum 24 rotates, the shift fork 23 is displaced in an axial direction of the shift drum 24 according to the shape of the guide grooves formed in the outer periphery of the shift drum 24. With this, the gear engagement on the counter shaft 27 and on the main shaft 26 changes, and the shift-up or the shift-down of the transmission 21 is made.

The AMT 16 according to the present embodiment is configured so that the inner main shaft 26a joined to the first clutch CL1 supports odd-numbered gears (first, third, and fifth gears) and the outer main shaft 26b joined to the second clutch CL2 supports even-numbered gears (second, fourth, and sixth gears). Therefore, for example, during running in the odd-numbered gear, an oil pressure supply to the first clutch CL1 is continued, and a connected state is maintained. Furthermore, while a shift is changed, it becomes possible, as long as the gear engagement is changed in advance by the rotation of the shift drum 24, to complete the gear-shift operation only by switching the connected states of the two clutches.

Referring to FIG. 2 additionally, the inner main shaft 26a which is connected to the first clutch CL1 supports odd-numbered driving gears M1, M3, and M5. The first driving gear M1 is formed integrally with the inner main shaft 26a. Furthermore, the third driving gear M3 is attached thereto slidably in the axial direction and non-rotatably in the circumferential direction. The fifth driving gear M5 is attached thereto non-slidably in the axial direction and rotatably in the circumferential direction. On the other hand, the outer main shaft 26b which is connected to the second clutch CL2 supports even-numbered driving gears M2, M4, and M6. The second driving gear M2 is formed integrally with the outer main shaft 26b. Furthermore, the fourth driving gear M4 is attached thereto slidably in the axial direction and non-rotatably in the circumferential direction. The sixth driving gear M6 is attached thereto non-slidably in the axial direction and rotatably in the circumferential direction.

Meanwhile, the counter shaft 27 supports driven gears C1 to C6 which engage with the driving gears M1 to M6. The first to the fourth driven gears C1 to C4 are attached thereto non-slidably in the axial direction and rotatably in the circumferential direction. The fifth and sixth driven gears C5 and C6 are attached slidably in the axial direction and non-rotatably in the circumferential direction. In the AMT 16, the driving gears M3 and M4 and the driven gears C5 and C6, i.e., gears which are slidable in the axial direction, among the above-described gear train, are slid by the shift forks 23. Accordingly, the gear-shift operation is performed by connecting and disconnecting a dog clutch.

In the AMT 16, when the first gear is selected for example, the rotational driving force of the engine, which is transmitted from the crankshaft 30 to the primary driven gear 32, is transmitted to the inner main shaft 26a by connecting the first clutch CL1 thereto, and then transmitted from the first driving gear M1 to the counter shaft 27 via the first driven gear C1. At this time, a dog clutch for the first gear is in a state of being engaged between the first driven gear C1 and the fifth driven gear C5.

Furthermore, when the rotational driving force is transmitted by the first gear, the AMT 16 can execute "preliminary shifting" for preparing a gear shift for the second gear by engaging a dog clutch for the second gear, i.e., the dog clutch between the sixth driven gear C6 and the second driven gear C2. At this time, since the second clutch CL2 is disconnected, even if the dog clutch for the second gear is engaged during running in the first gear, the rotational driving force of the engine only makes the outer main shaft 26b run idle with the second driving gear M2. Furthermore, after this preliminary shifting, if the connected state of the clutch is switched from the first clutch CL1 to the second clutch CL2, the rotational driving force can be outputted instantly without interruption from the counter shaft via the second gear.

The shift drum 24 of the AMT 16 sets a position of "waiting for neutral" between predetermined rotating positions for selecting gear stages. At the position of "waiting for neutral," among groups of the even-numbered gears and the odd-numbered gears, a group of gears not transmitting the rotational driving force is made to be in a neutral state. For this reason, it is possible to make the odd-numbered gear into the neutral state during running in the even-numbered gear, as well as to make the even-numbered gear into the neutral state during running in the odd-numbered gear.

Figure 3:
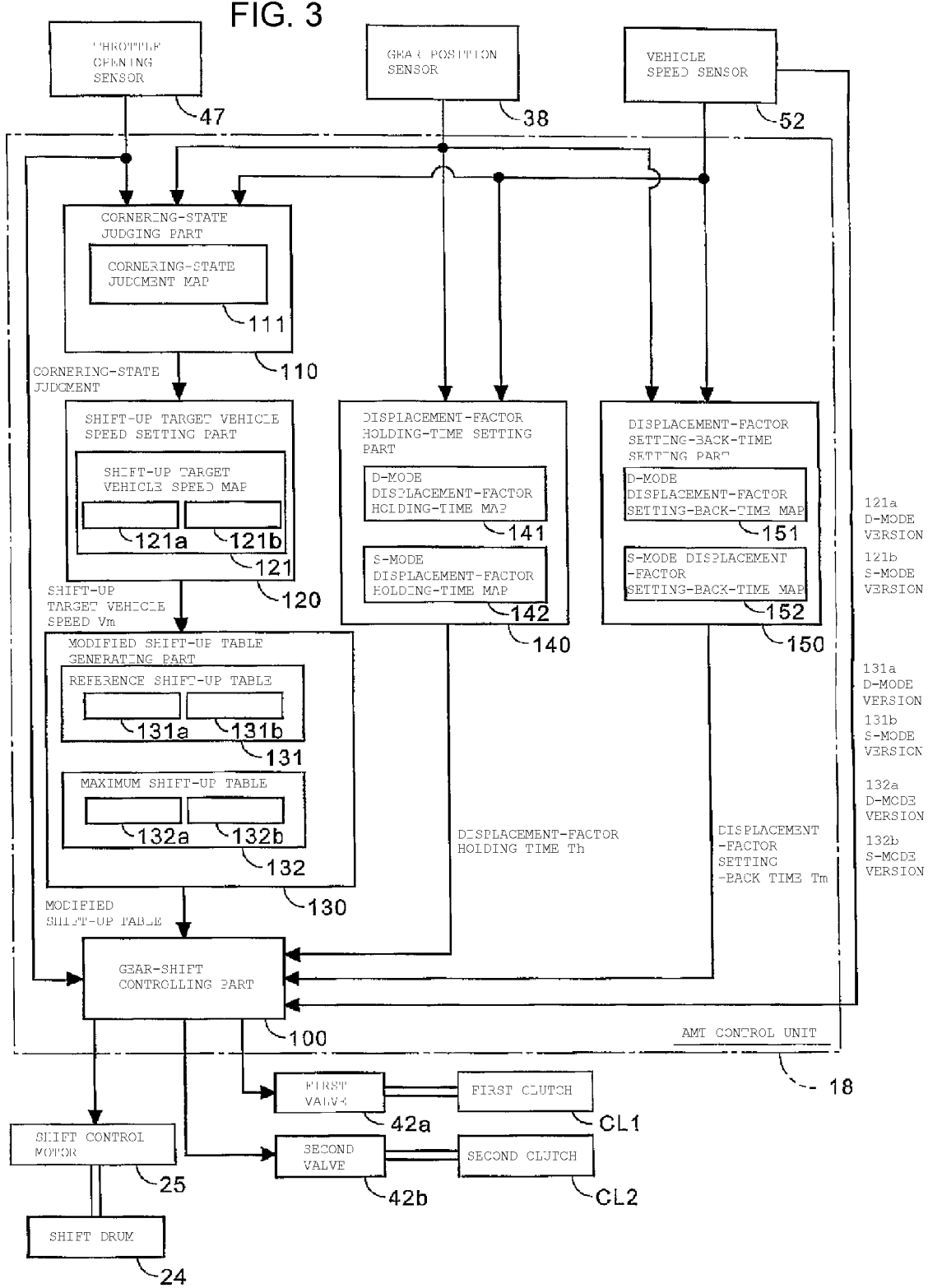
FIG. 3 is a block diagram showing a structure of an AMT control unit and its peripheral devices.

FIG. 3 is a block diagram showing a structure of the AMT control unit 18 according to the embodiment of the present invention and its peripheral devices. The same numerals as the above indicate the same or equivalent components. The AMT control unit 18 includes a cornering-state judging part 110, a shift-up target vehicle speed setting part 120, a modified shift-up table generating part 130, a displacement-factor holding-time setting part 140, a displacement-factor setting-back-time setting part 150, and a gear-shift controlling part 100. The AMT control unit 18 receives information from the throttle opening sensor 47, the gear position sensor 38, and a vehicle speed sensor 52.

While the automatic transmission (AT) mode is selected, the gear-shift controlling part 100 performs automatic gear-shift control according to information on the vehicle speed, the throttle opening, and the gear position by use of a reference shift-up table 131 in the shift-up table generating part 130. In the present embodiment, upon detection that the motorcycle has transitioned from a normal running state to a cornering (turning) state, a "modified shift-up table," which makes a shift-up more difficult to occur than the reference shift-up table 131 does, is generated and the gear-shift control is performed using this table. Accordingly, during cornering, a shift-up (gear-shift operation) is suppressed and thus large torque fluctuations can be prevented from being produced in the drive wheel. As will be described later in detail, the modified shift-up table is newly generated every time a cornering state is detected.

Figure 4:
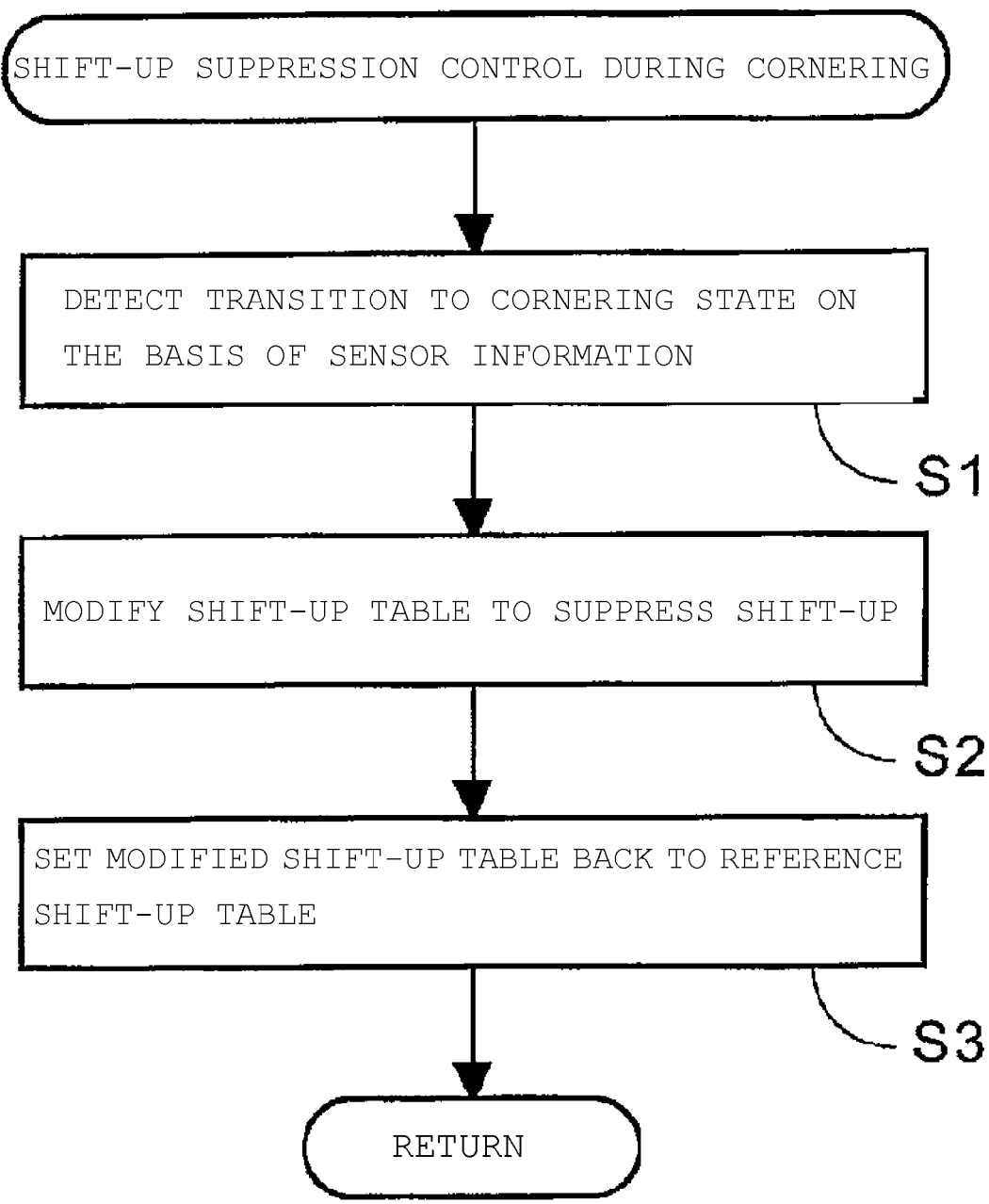
FIG. 4 is a flowchart showing steps in shift-up suppression control during cornering according to the embodiment.

FIG. 4 is a flowchart showing steps in shift-up suppression control during cornering according to the embodiment. The shift-up suppression control during cornering mainly includes three steps. Firstly, at Step S1, the transition to a cornering state is detected based on the sensor information on each of the vehicle speed, the throttle opening, and the current gear position. At Step S2, the shift-up table is modified to suppress a shift-up during the cornering. Then, at Step S3, the modified shift-up table is set back to the reference shift-up table, and the series of controls ends.

Returning to the block diagram in FIG. 3, the cornering-state judging part 110 judges whether the motorcycle has transitioned to a cornering state, by use of the sensor information on each of the vehicle speed, the throttle opening, and the current gear position as well as a cornering-state judgment map 111.

Upon receipt of a judgment that the motorcycle has transitioned to a cornering state, the shift-up target vehicle speed setting part 120 calculates a shift-up target vehicle speed Vm from the sensor information on each of the current gear position and the vehicle speed at the time of entering the cornering state as well as a shift-up target vehicle speed map 121.

The modified shift-up table generating part 130 generates a modified shift-up table suitable for the cornering state by using the shift-up target vehicle speed Vm, the reference shift-up table 131 and a maximum shift-up table 132.

As described above, the AMT control unit 18 is configured to be able to select the D (drive) mode or the S (sport) mode while the automatic transmission (AT) mode is selected, the D (drive) mode being excellent in quietness and fuel saving and thus suitable for cruising and the like, the S (sport) mode allowing a greater engine speed for gear shift to provide a rapid acceleration. For the D mode and the S mode, a D-mode version 121a and an S-mode version 121b are prepared for the shift-up target vehicle speed map 121. Moreover, a D-mode version 131a and an S-mode version 131b are prepared for the reference shift-up table 131. Furthermore, a D-mode version 132a and an S-mode version 132b are prepared for the maximum shift-up table 132.

The displacement-factor holding-time setting part 140 sets a displacement-factor holding time Th being the time during which the generated modified shift-up table is used as it is. A D-mode displacement-factor holding-time map 141 or an S-mode displacement-factor holding-time map 142 is used to calculate the displacement-factor holding time Th of the corresponding running mode.

After the elapse of the displacement-factor holding time Th, the generated modified shift-up table is modified continuously and set back to the reference shift-up table. The displacement-factor setting-back-time setting part 150 sets a displacement-factor setting-back time Tm being the time required for the modified shift-up table to be set back to the reference shift-up table (time from the start to the end of the setting back). A D-mode displacement-factor setting-back-time map 151 or an S-mode displacement-factor setting-back-time map 152 is used to calculate the displacement-factor setting-back time Tm of the corresponding running mode.

Upon detection of the transition to a cornering state, the gear-shift controlling part 100 drives the shift control motor 25 and the first and second valves 42a and 42b on the basis of the modified shift-up table generated by the modified shift-up table generating part 130, the throttle opening information, the vehicle speed information, the displacement-factor holding time Th calculated by the displacement-factor holding-time setting part 140, and the displacement-factor setting-back time Tm calculated by the displacement-factor setting-back-time setting part 150.

Figure 5:
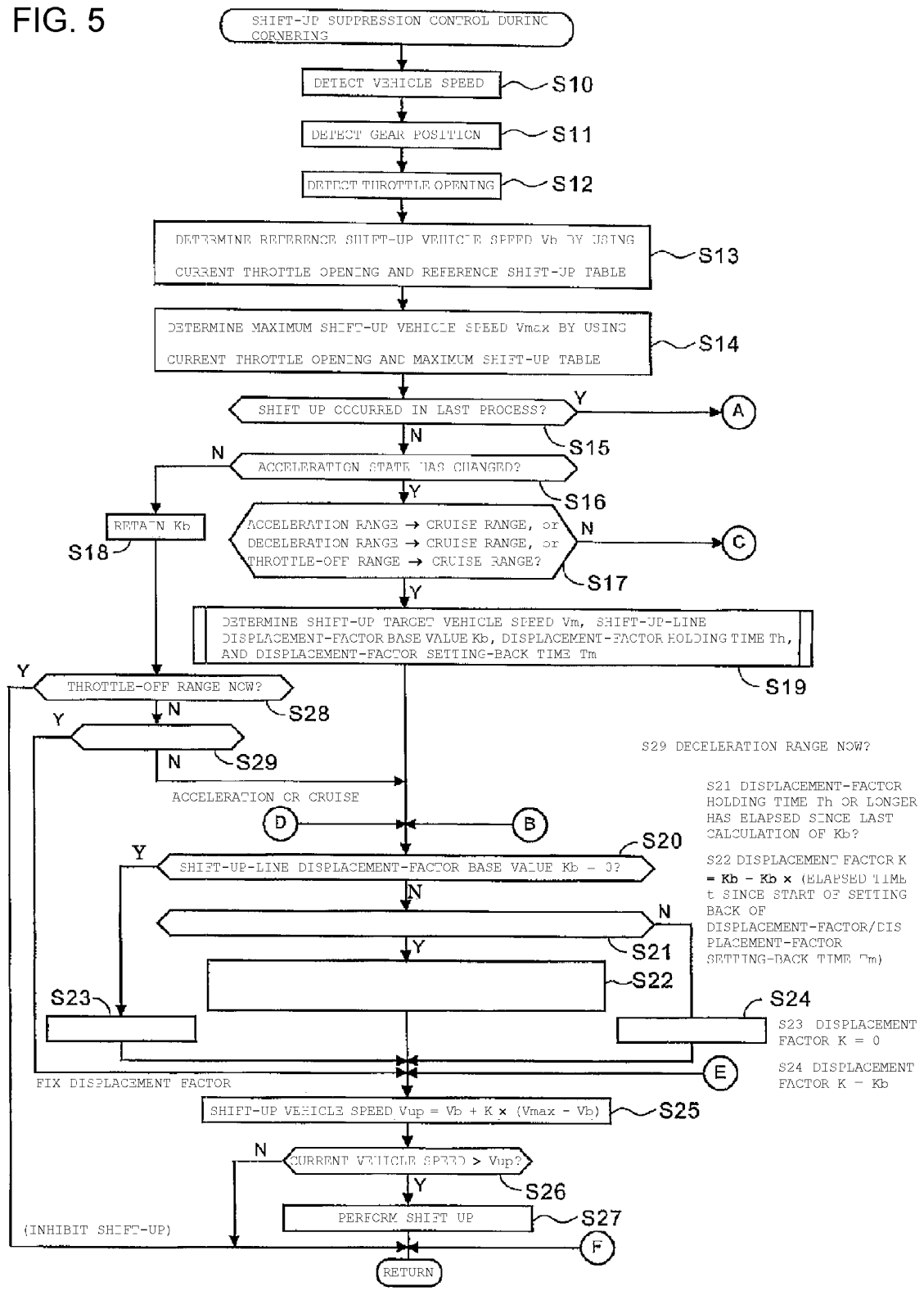
FIG. 5 is a flowchart showing in detail the steps in the shift-up suppression control during cornering.

FIG. 5 is a flowchart showing in detail the steps in the shift-up suppression control during cornering. First, once the vehicle speed is detected at Step S10, the current gear position (gear level) is detected at Step S11, and the throttle opening is detected at subsequent Step S12.

At Step S13, a reference shift-up vehicle speed Vb is determined by use of the throttle opening and the reference shift-up table 131. At Step S14, a maximum shift-up vehicle speed Vmax is determined by use of the throttle opening and the maximum shift-up table 132. Now, see FIGS. 9 and 10.

Figure 9:
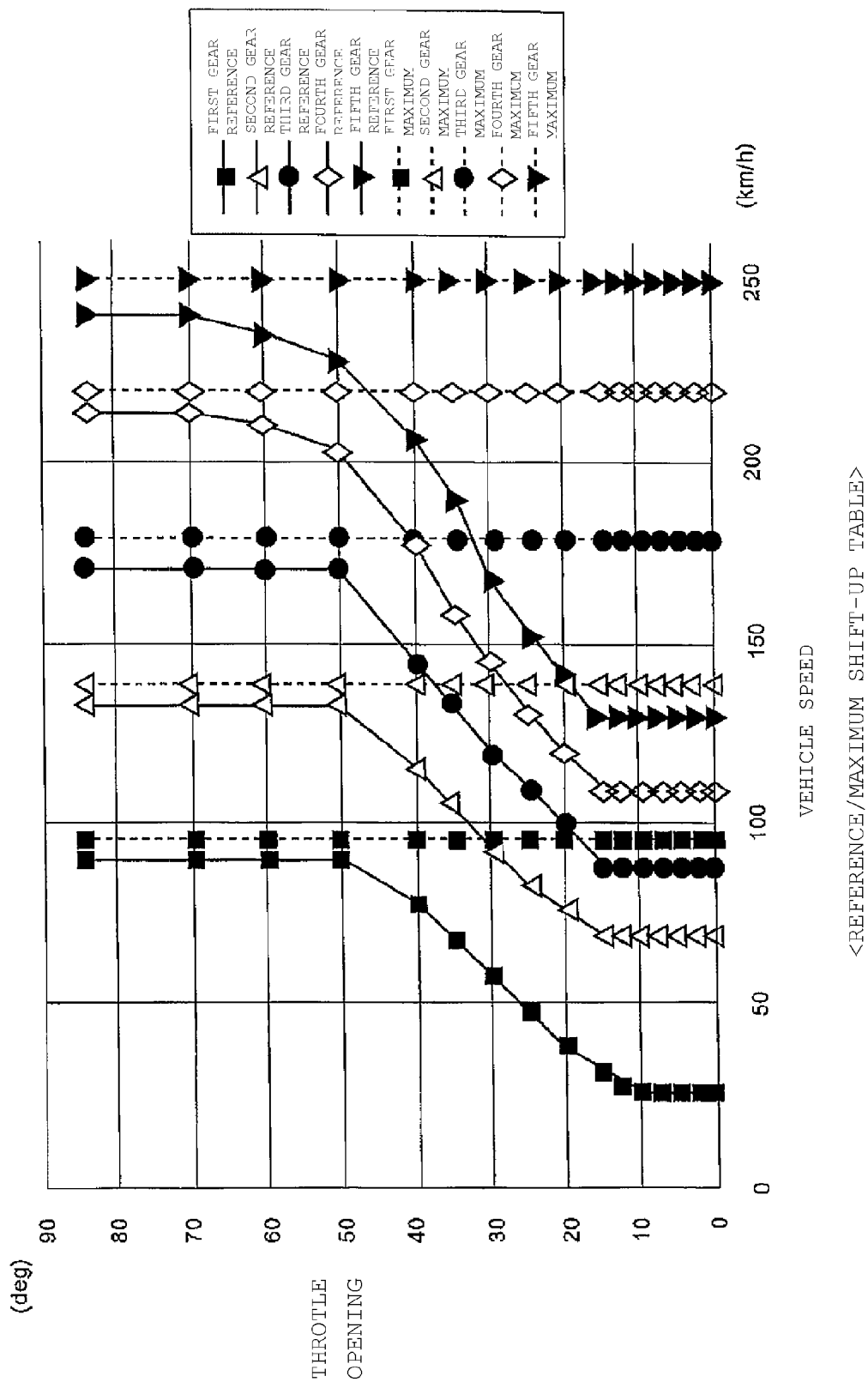
FIG. 9 is reference/maximum shift-up tables each corresponding to the gear levels.

FIG. 9 is a reference shift-up table and a maximum shift-up table each corresponding to the first to fifth gear levels. Each maximum shift-up table is one obtained by modifying its corresponding reference shift-up table to the largest extent. For example, in a case where the first gear (indicated by graphs with black squares) is selected and the throttle opening is 30 degrees, shift-up occurs when the vehicle speed exceeds 60 km/h while the reference shift-up table is used. On the other hand, while the maximum shift-up table is used, shift-up does not occur until the vehicle speed exceeds approximately 90 km/h. A modified shift-up table to be used during cornering is generated within a range between the reference shift-up table and the maximum shift-up table. A modified shift-up table closer to the maximum shift-up table allows the gear-shift control to suppress a shift-up during cornering to a greater extent.

The reference shift-up vehicle speed Vb and the maximum shift-up vehicle speed Vmax are calculated from the reference shift-up table and the maximum shift-up table, respectively.

Figure 10:
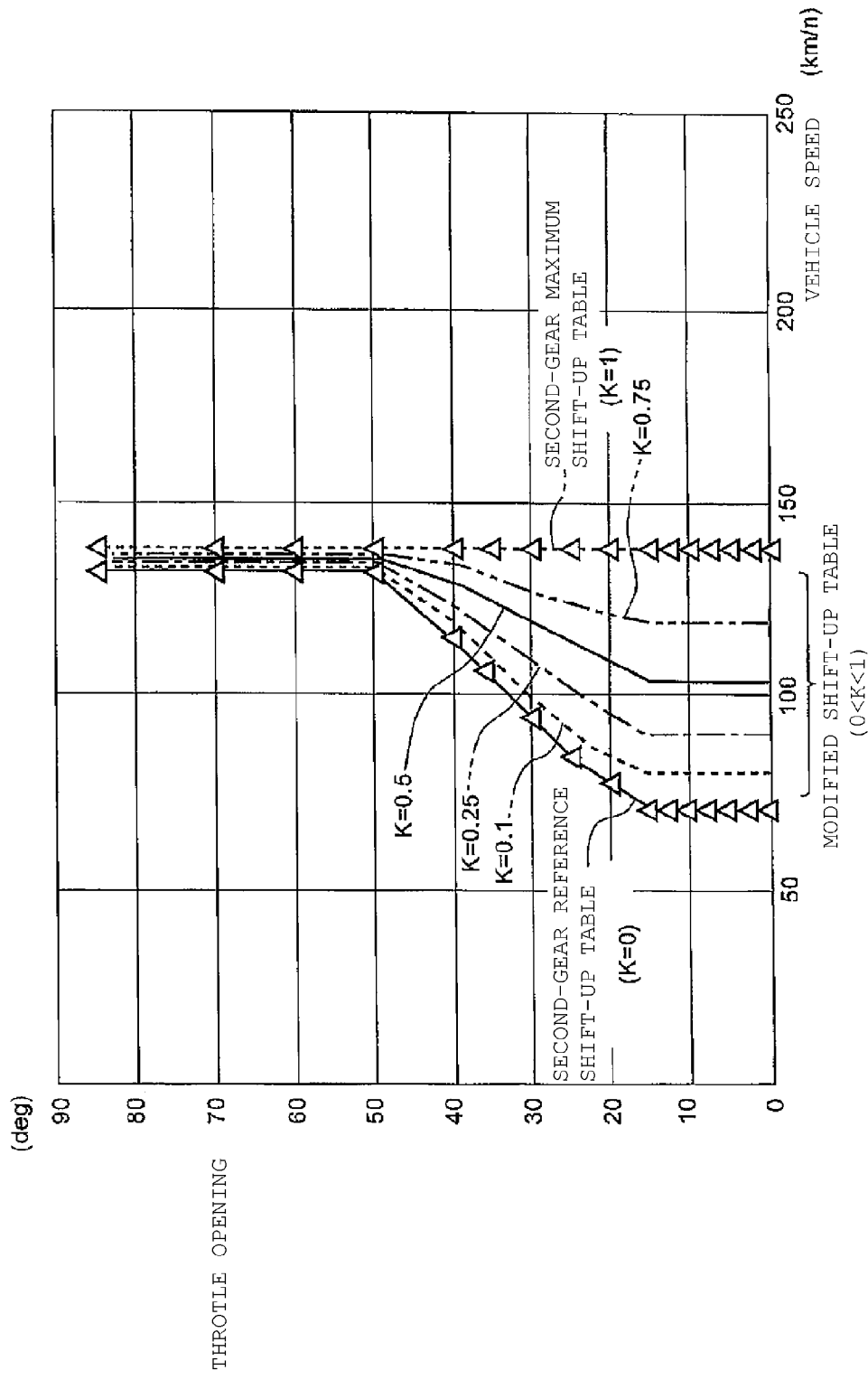
FIG. 10 is a graph showing some modified shift-up tables generated as examples.

FIG. 10 is a graph showing some modified shift-up tables generated as examples. This graph shows a case of a modified shift-up table for the second gear. As described above, a modified shift-up table is generated within a range between the reference shift-up table and the maximum shift-up table every time the transition to a cornering state is detected. The modified degree of the modified shift-up table with respect to the reference shift-up table is indicated by a displacement factor K, and K=1 is equivalent to the maximum shift-up table. The graph shows modified shift-up tables in which the displacement factor K is 0.1, 0.25, 0.5, and 0.75, but the displacement factor K is not limited to such values and can be set to various other values. Accordingly, the gear-shift suppression control can be made according to various cornering states.

Returning to the flowchart in FIG. 5, it is judged at Step S15 whether or not a shift-up has occurred in the last process. In a case of a negative judgment at Step S15, the control proceeds to Step S16, where it is judged whether or not the acceleration state has changed. In a case of a positive judgment there, the control proceeds to Step S17. In a case of a negative judgment at Step S16, then at Step S18, the value of a shift-up-line displacement-factor base value Kb to be described later is retained, and a process to set back the shift-up table, a process to fix the shift-up table, or a process to inhibit a shift-up is performed in accordance with the current acceleration state. Specifically, it is judged at Step S28 whether or not the running state of the vehicle is currently in a throttle-off range. In a case of a positive judgment there, no shift-up is performed and the series of controls ends. On the other hand, in a case of a negative judgment at Step S28, the control proceeds to Step S29, where it is judgment whether or not the running state of the vehicle is currently in a deceleration range. The control proceeds to Step S20 in a case of a negative judgment at Step S29, and to Step S25 in a case of a positive judgment.

At Step S17, as the cornering state judgment to be made by the cornering-state judging part 110 (see FIG. 3), it is judged whether the running state of the vehicle has entered a cruise range from an acceleration range, has entered the cruise range from the deceleration range, or has entered the cruise range from the throttle-off range. Now, see FIG. 11.

Figure 11:
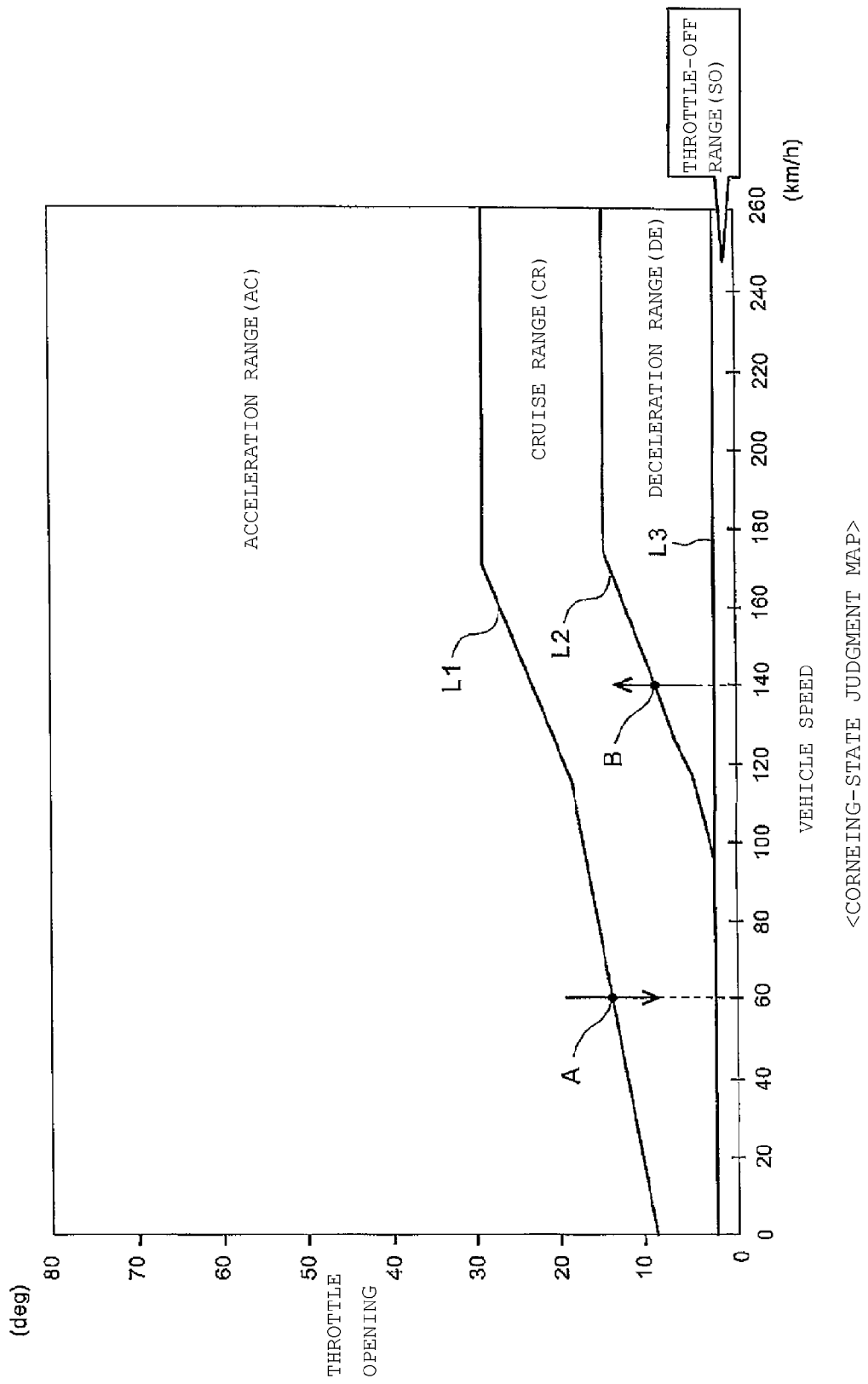
FIG. 11 is a cornering-state judgment map.

FIG. 11 is a cornering-state judgment map 111 in the cornering-state judging part 110. The cornering-state judgment map 111 is a data map showing the relationship between the vehicle speed and the throttle opening and is prepared for each gear position (FIG. 11 shows one for the third gear). Using the cornering-state judgment map 111 corresponding to the current gear position, the cornering-state judging part 110 constantly monitors whether or not the vehicle has transitioned to a cornering state.

In the cornering-state judgment map 111, the running state of the vehicle is divided into four ranges, namely, acceleration range (AC), cruise range (AC), deceleration range (DE), and throttle-off range (SO). The acceleration range and the cruise range are defined by a boundary line L1, and the cruise range and the deceleration range are defined by a boundary line L2. In addition, the deceleration range and the throttle-off range are separated by a boundary line L3. The throttle-off range refers to a small opening range where the throttle opening is almost zero.

The cornering-state judging part 110 judges that the vehicle has transitioned to a cornering state, by knowing that the running state has entered the cruise range from the acceleration range or has entered the cruise range from the deceleration range. For example, the cornering-state judging part 110 judges that the vehicle has transitioned to a cornering state, when the running state crosses the boundary line L1 at a point A to enter the cruise range from the acceleration range due to the closing of the throttle at a vehicle speed of 60 km/h, or when the running state crosses the boundary line L2 at a point B to enter the cruise range from the deceleration range due to the opening of the throttle at a vehicle speed of 140 km/h.

The cornering judgment can be achieved by use of only the sensor information on the throttle opening and the vehicle speed in this manner, because the present inventors focused on the fact that the driver usually decelerates or accelerates before cornering and drives with smaller speed fluctuations during cornering. Accordingly, it is no longer necessary to provide a separate accurate bank angle sensor for detecting the transition to a cornering state, whereby the number of components and man-hours for manufacturing can be reduced.

Returning to the flowchart in FIG. 5, in a case of a positive judgment at Step S17, i.e., in a case where the transition to a cornering state is detected, the control proceeds to Step S19, where the shift-up target vehicle speed Vm, the shift-up-line displacement-factor base value Kb, the displacement-factor holding time Th, and the displacement-factor setting-back time Tm are determined. Now, see FIG. 8.

Figure 8:
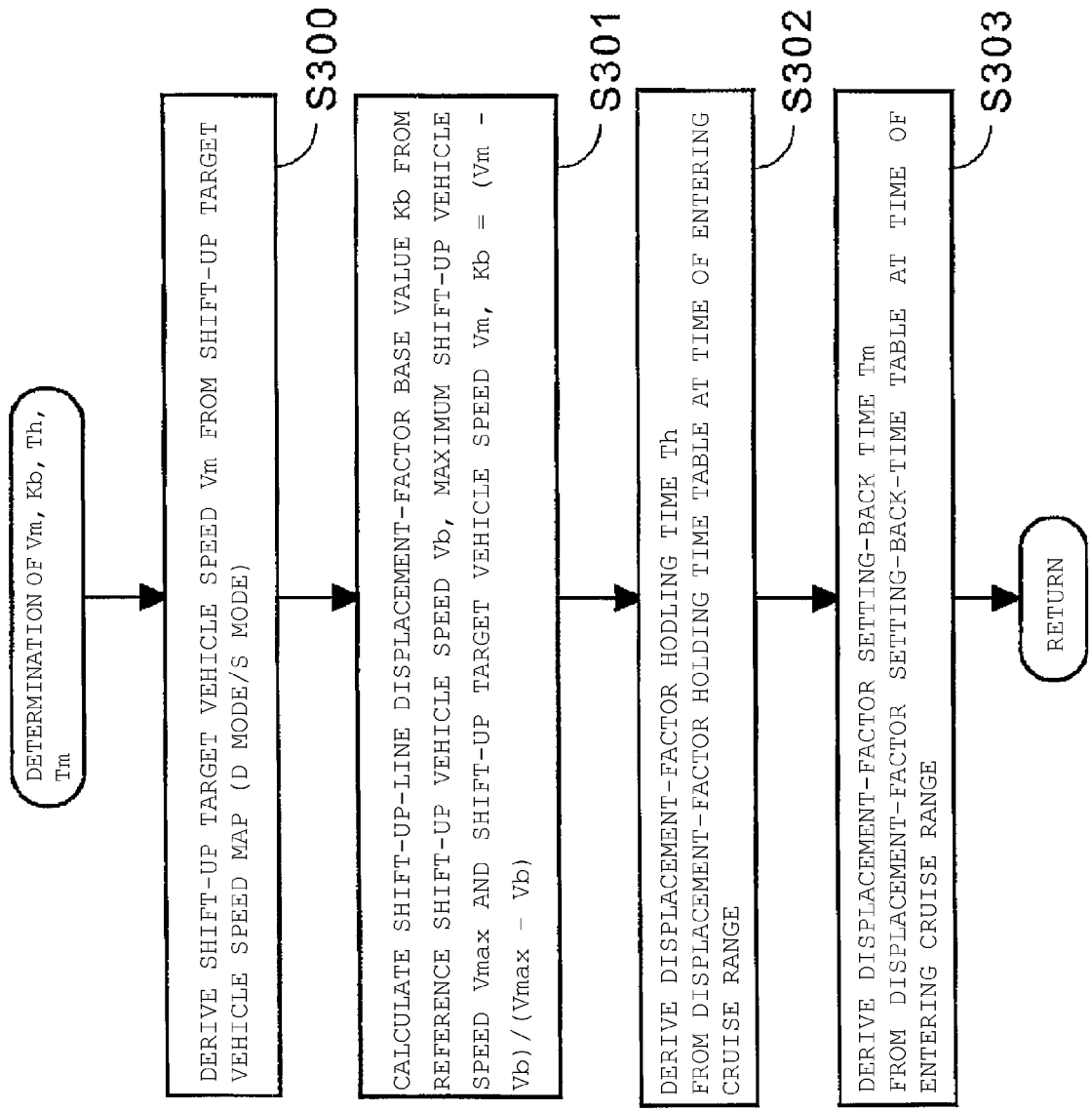
FIG. 8 is a sub-flow showing steps to determine Vm, Kb, Th, and Tm.
Figure 12:
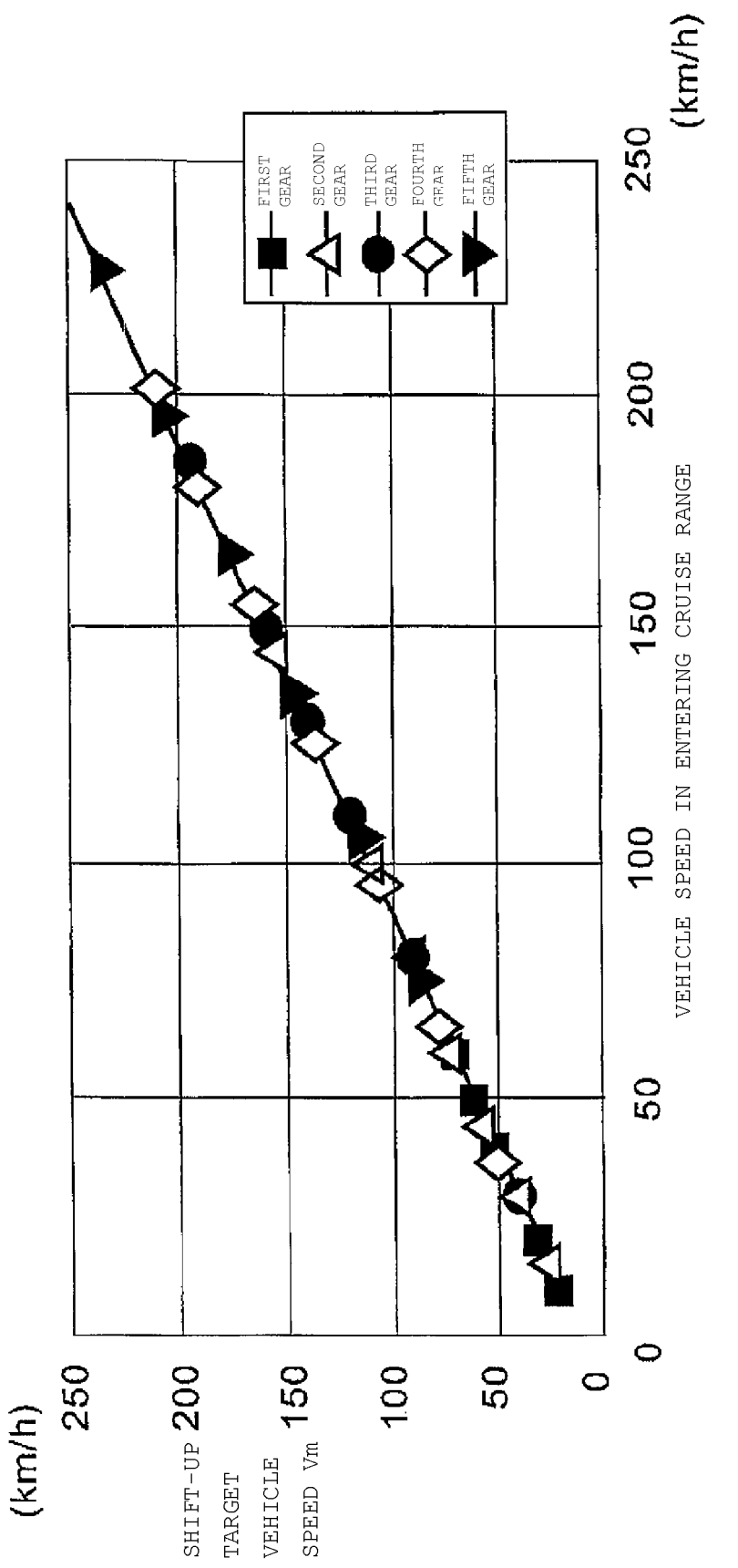
FIG. 12 is a D-mode shift-up target vehicle speed map.
Figure 13:
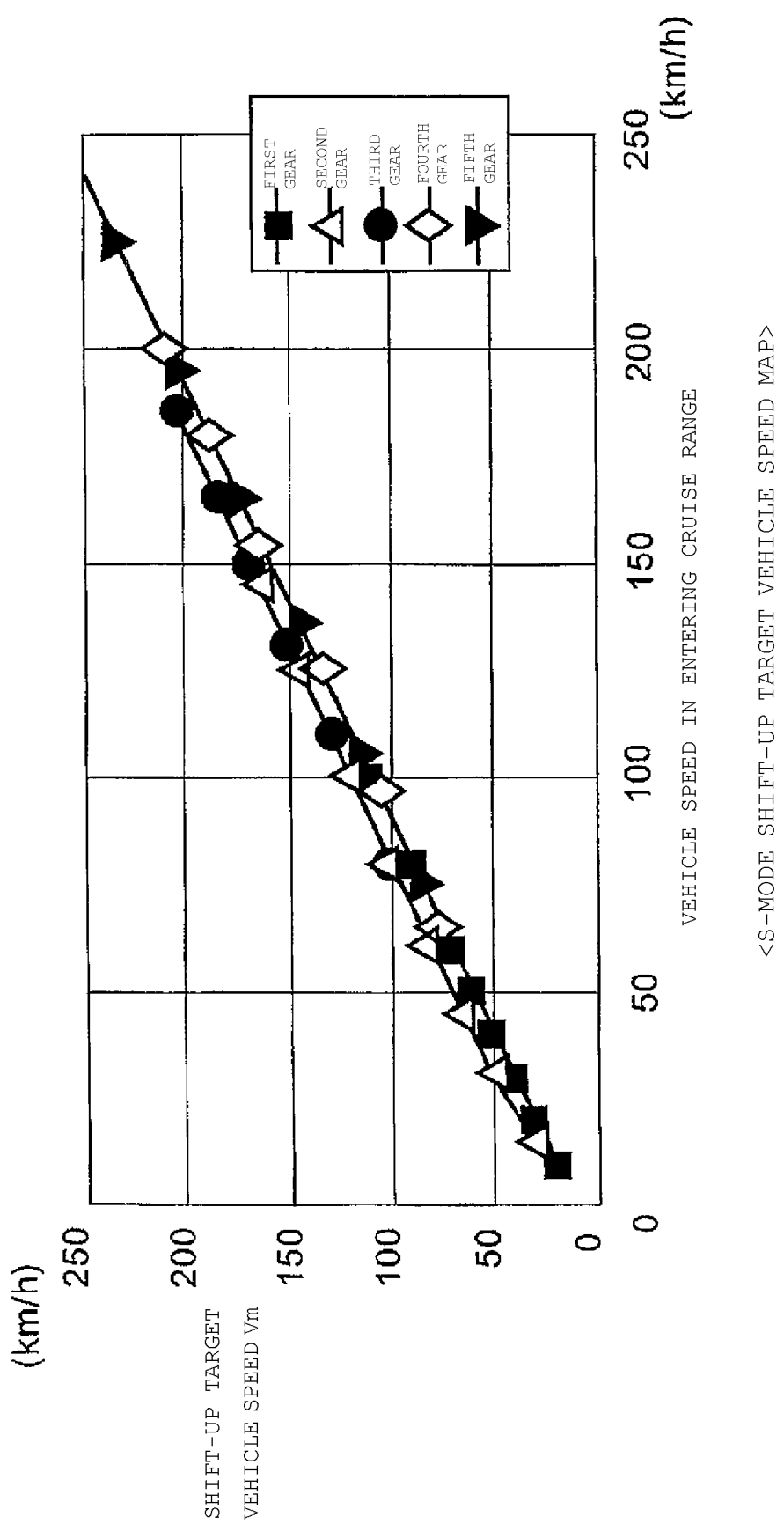
FIG. 13 is an S-mode shift-up target vehicle speed map.

FIG. 8 is a sub-flow showing steps to determine Vm, Kb, Th, and Tm described above. At Step S300, the shift-up target vehicle speed Vm is derived from a shift-up target vehicle speed map. As shown in FIGS. 12 and 13, a D-mode version and an S-mode version are provided also for the shift-up target vehicle speed map, and they are set for each gear position. The S-mode map is so set that the shift-up target vehicle speeds Vm at the second and third gears would be slightly higher than those in the D-mode map.

Next, at Step S301, using the values of the reference shift-up vehicle speed Vb, the maximum shift-up vehicle speed, and the shift-up target vehicle speed Vm, the shift-up-line displacement-factor base value Kb is calculated from a calculation formula, $Kb=(Vm-Vb)/(Vmax-Vb)$. Kb is a value representing the modified degree of a modified shift-up table with respect to the reference shift-up table.

Figure 14:
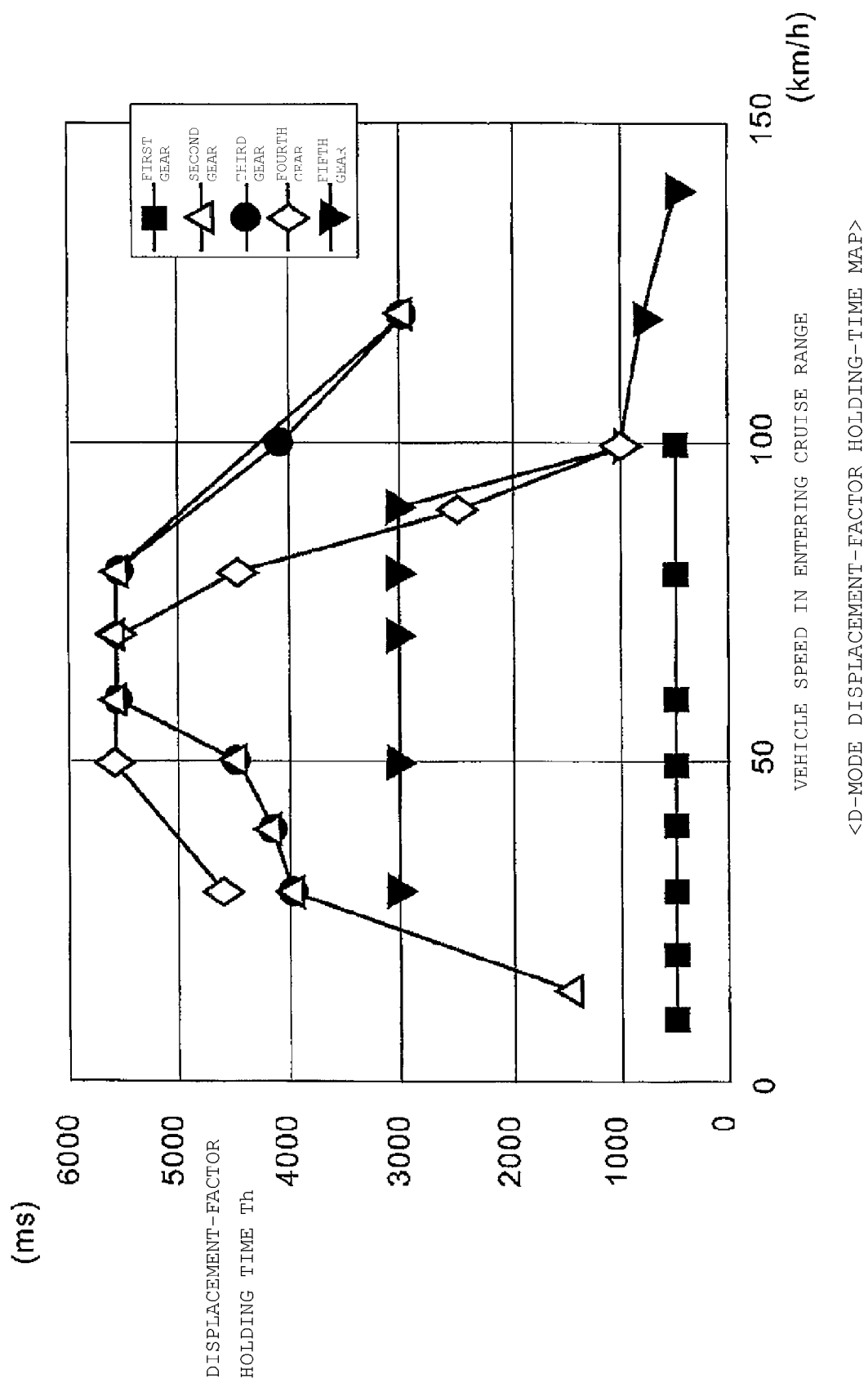
FIG. 14 is a D-mode displacement-factor holding-time map at the time of entering a cruise range.
Figure 15:
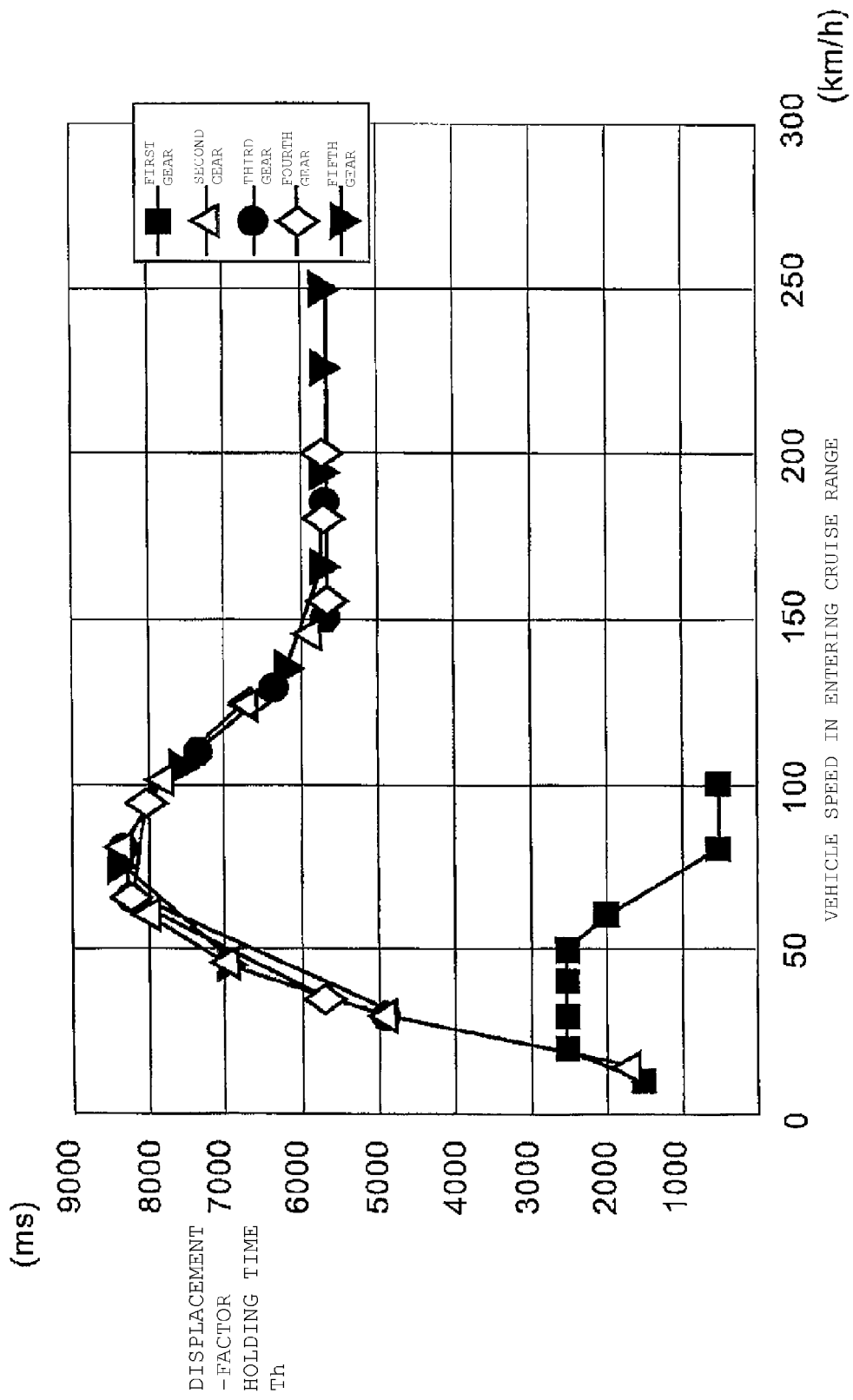
FIG. 15 is an S-mode displacement-factor holding-time map at the time of entering a cruise range.

At subsequent Step S302, the displacement-factor holding time Th is derived from a displacement-factor holding-time map at the time of entering the cruise range. As shown in FIGS. 14 and 15, a D-mode version and an S-mode version are provided also for the displacement-factor holding-time map at the time of entering the cruise range, and they are set for each gear position. The displacement-factor holding time Th is generally longer in the S-mode map than in the D-mode map. In other words, the time during which to continue the shift-up suppression control is set longer in the S-mode map than in the D-mode map. Moreover, settings are made such that there exists a large difference between the gear positions in the D-mode map whereas the maps for the second to fifth gears approximate to each other in the S-mode map.

Figure 16:
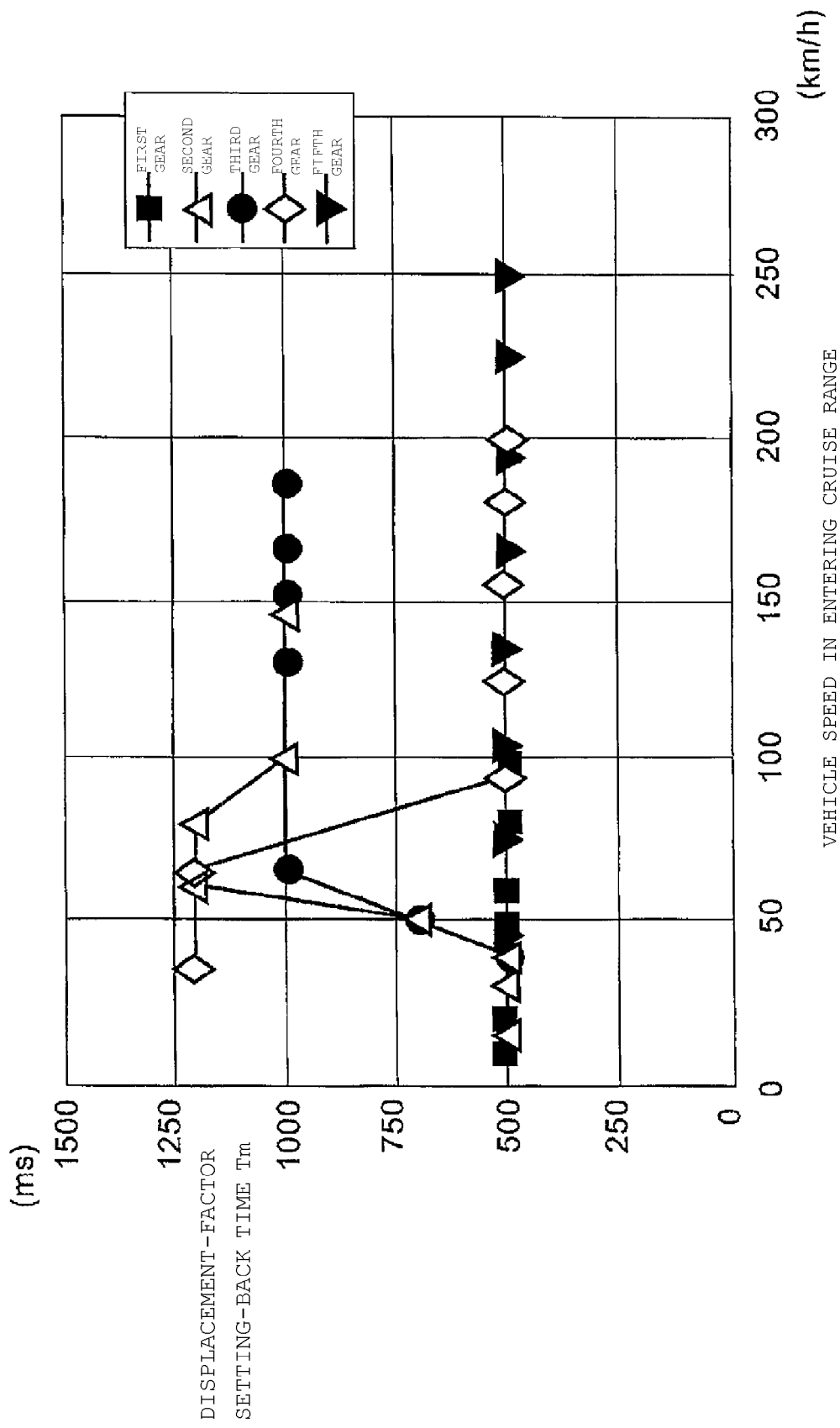
FIG. 16 is a D-mode displacement-factor setting-back-time map at the time of entering a cruise range.
Figure 17:
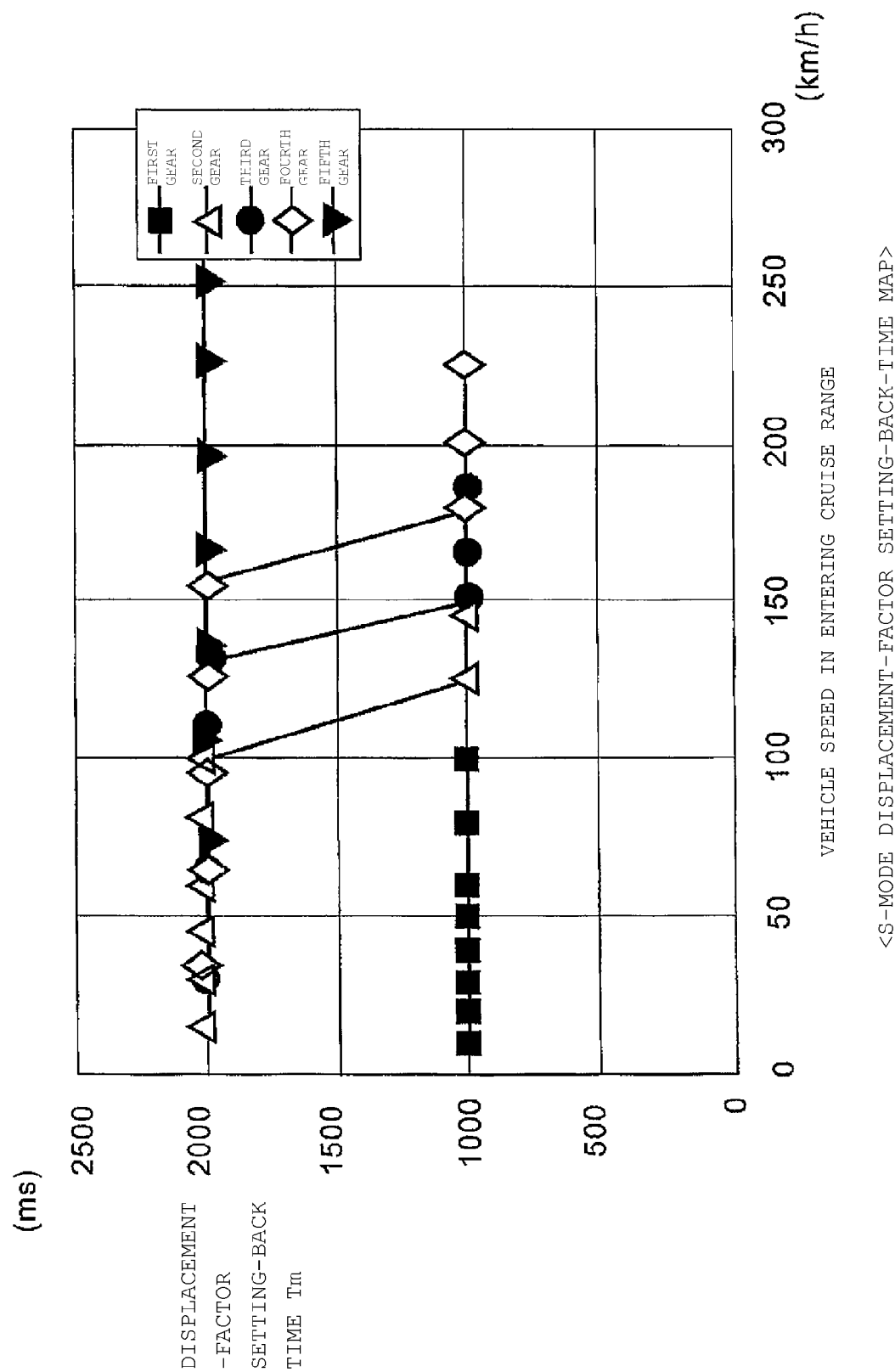
FIG. 17 is an S-mode displacement-factor setting-back-time map at the time of entering a cruise range.

Furthermore, in Step S303, the displacement-factor setting-back-time Tm is derived from a displacement-factor setting-back-time map at the time of entering the cruise range. As shown in FIGS. 16 and 17, a D-mode version and an S-mode version are provided also for the displacement-factor setting-back-time map at the time of entering the cruise range, and they are set for each gear position. The displacement-factor setting-back-time Tm is generally longer in the S-mode map than in the D-mode map. Once Vm, Kb, Th, and Tm are obtained through Steps S300 to S303, the control proceeds to Step S20 in the main flow in FIG. 5.

At Step S20, it is judged whether or not the shift-up-line displacement-factor base value Kb is zero. In a case of a negative judgment at Step S20, the control proceeds to Step S21.

At Step S21, it is judged whether or not the displacement-factor holding time Th or longer has elapsed since the shift-up-line displacement-factor base value Kb is calculated last time. In a case of a positive judgment at Step S21, the control proceeds to Step S22, where a displacement factor K is calculated from a computation formula, displacement factor $K=Kb-Kb\times$(time t elapsed since start of setting back of displacement factor/displacement-factor setting-back time Tm). In sum, the shift-up-line displacement-factor base value Kb is a value indicating the modified degree of a modified shift-up table generated upon detection of a cornering state, whereas the displacement factor K is a value indicating the current modified degree involving the time elapsed since the transition to the cornering state.

At subsequent Step S25, a shift-up vehicle speed Vup is calculated from a computation formula, $Vup=Vb+K\times(Vmax-Vb)$. The shift-up vehicle speed Vup serves as a shift-up condition during the shift-up suppression control, and takes a value larger than the reference shift-up vehicle speed Vb. Specifically, the shift-up suppression control according to the present embodiment makes a shift-up difficult to occur during cornering by increasing the shift-up vehicle speed as compared to that during the normal running state.

Note that in a case of a positive judgment in Step S20, zero is set to the displacement-factor K at Step S23, and the control skips Steps S21 and S22 and proceeds to Step S25. On the other hand, in a case of a negative judgment in Step S21, Kb is set to the displacement factor K at Step S24, and the control skips Steps S21 and S22 and proceeds to Step S25.

At Step S26, it is judged whether or not the current vehicle speed has exceeded the shift-up vehicle speed Vup. In a case of a positive judgment there, the control proceeds to Step S27 and performs a shift-up. In a case of a negative judgment at Step S26, no shift-up is performed and the series of controls ends.

Figure 6:
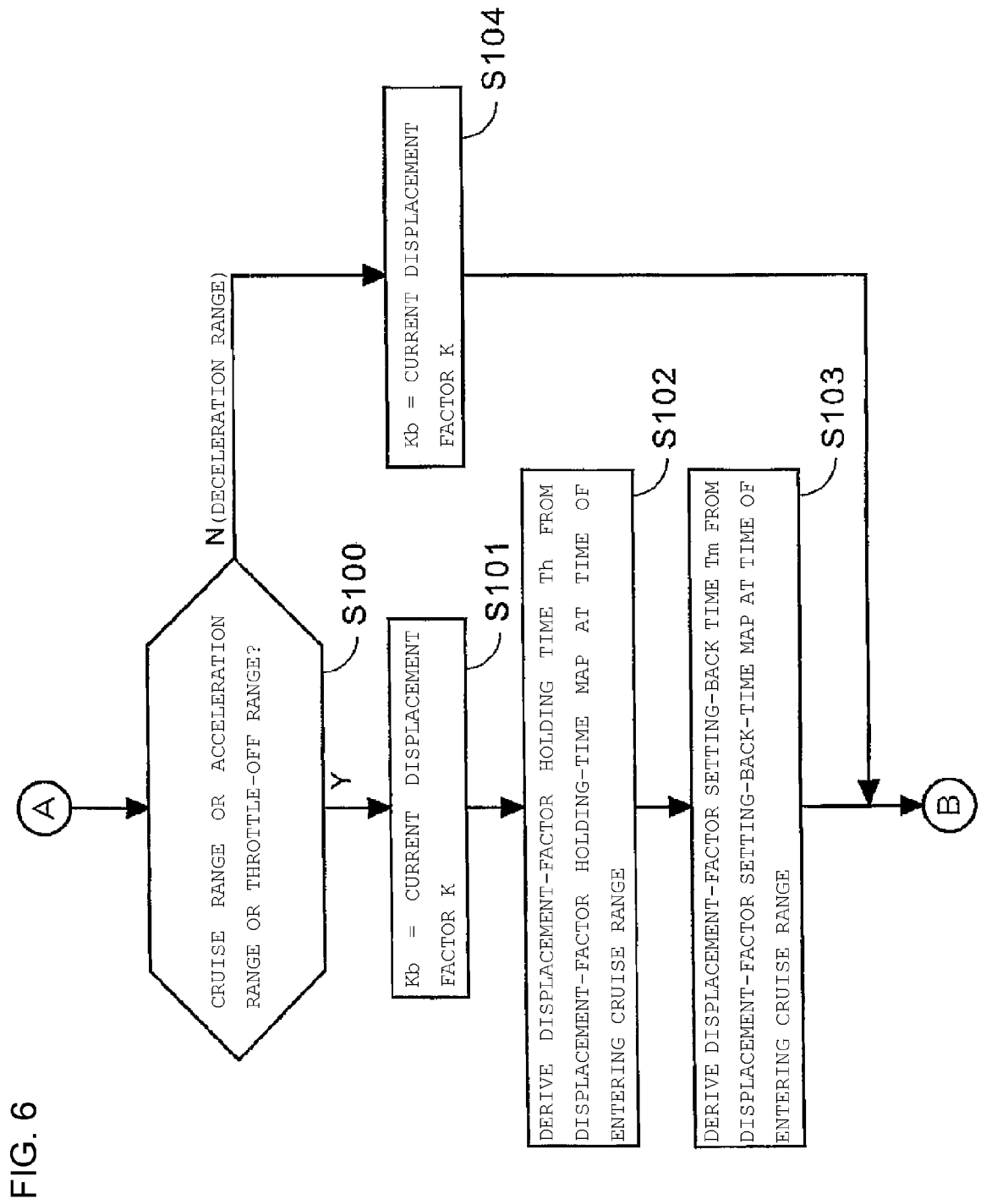
FIG. 6 is a sub-flow in a main flow shown in FIG. 5.

Next, description will be given of the flow of the control in a case of a positive judgment at Step S15 described above. The control proceeds to a sub-flow (A) shown in FIG. 6 in a case of a positive judgment at Step S15, i.e., in a case where a shift-up has occurred after the last judgment regarding entering a cornering state. This sub-flow (A) is a process to avoid successive shift-ups by holding the displacement factor in the case where a shift-up did occur last time. Firstly, at Step S100, it is judged whether the running state of the vehicle is in the cruise range, the acceleration range, or the throttle-off range. In a case of a positive judgment at Step S100, the current displacement factor K is set as Kb at Step S101.

At Step S102, a displacement-factor holding time Th is derived from the aforementioned displacement-factor holding-time table at the time of entering the cruise range (see FIGS. 14 and 15). Further, at Step S103, a displacement-factor holding time Tm is derived from the aforementioned displacement-factor setting-back-time table at the time of entering the cruise range (see FIGS. 16 and 17), and then the control returns to (B) of the main flow. As described above, in a case of a positive judgment at Step S15, the displacement-factor holding time and the displacement-factor setting-back time are newly set so that successive shift-ups can be avoided. Note that in a case of a negative judgment at Step S100, the current displacement factor K is set as Kb at Step S104, and the control returns to the main flow.

Figure 7:
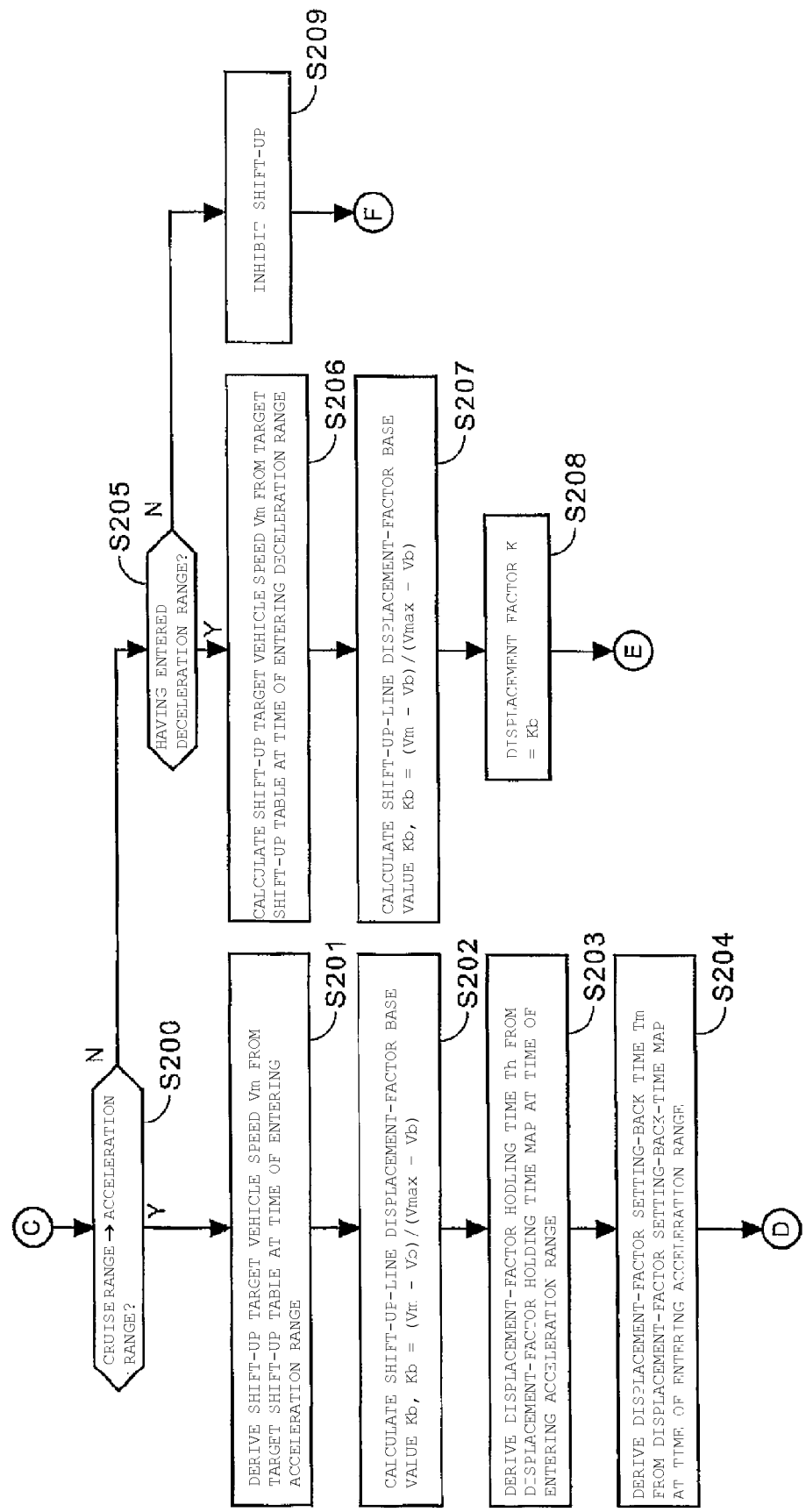
FIG. 7 is a sub-flow in the main flow shown in FIG. 5.

Next, description will be given of the flow of the control in a case of a negative judgment at Step S17 described above. The control proceeds to a sub-flow (C) shown in FIG. 7 in a case of a negative judgment at Step S17, i.e., in a case where a condition to judge whether the vehicle has transitioned to a cornering state is not met even though the acceleration state has changed. First, at Step S200, it is judged whether or not the running state of the vehicle has transitioned to the acceleration range from the cruise range. In a case of a positive judgment at Step S200, the control proceeds to Step S201, where the shift-up target vehicle speed Vm is derived from a target shift-up table at the time of entering the acceleration range (unillustrated).

At subsequent Step S202, using the values of the reference shift-up vehicle speed Vb, the maximum shift-up vehicle speed Vmax, and the shift-up target vehicle speed Vm, the shift-up-line displacement-factor base value Kb is calculated from the calculation formula, Kb=(Vm−Vb)/(Vmax−Vb).

Note that in the case of transition from the cruise range to the acceleration range, the AMT control unit 18 according to the present embodiment is configured to set the displacement-factor holding time Th and the displacement-factor setting-back time Tm differently from those in the case of transition to a cornering state. To set Th and Tm in such a case, the AMT control unit 18 also includes a displacement-factor holding-time map at the time of entering the acceleration range and a displacement-factor setting-back-time map at the time of entering the acceleration range (both unillustrated). At Step S203, the displacement-factor holding time Th is derived from this displacement-factor holding-time map at the time of entering the acceleration range. Further, at Step S204, the displacement-factor setting-back time Tm is derived from the displacement-factor setting-back-time map at the time of entering the acceleration range. Then, the control returns to (D) of the main flow.

On the other hand, in a case of a negative judgment at Step S200, the control proceeds to Step S205. At Step S205, it is judged whether or not the running state of the vehicle has entered the deceleration range. In a case of a positive judgment there, the control proceeds to Step S206. At Step S206, the shift-up target vehicle speed Vm is calculated based on a target shift-up table at the time of entering the deceleration range (unillustrated). At Step S207, the shift-up-line displacement-factor base value Kb is calculated. Further, at Step S208, the displacement factor K is set as Kb. Then, the control returns to the main flow. Here, the process to set the modified shift-up table back to the reference shift-up table is not performed, so that the modified state is maintained (K is fixed).

On the other hand, in a case of a negative judgment at Step S205, the control proceeds to Step S209, where it is assumed that the running state of the vehicle has entered the throttle-off range, and a shift-up is inhibited. This shift-up inhibition control is performed regardless of the state of the shift-up table (the value of the displacement factor K), by assuming that the throttle is closed substantially completely during running.

As described above, the AMT control unit 18 according to the present embodiment is configured to suppress a shift-up during cornering by replacing the reference shift-up table with the modified shift-up table upon detection of the transition of the vehicle to a cornering state. Accordingly, it is possible to perform gear-shift suppression control that is according to various cornering states. In addition, unlike a configuration which, for example, inhibits a shift-up for a predetermined period of time upon detection of the transition to a cornering state, the AMT control unit 18 allows a shift-up to occur even after the start of the shift-up suppression control if the vehicle exceeds a predetermined vehicle speed. This prevents maintaining a shift-up inhibition state until a predetermined period of time elapses against the rider's will. Accordingly, the gear-shift control can be continued without causing awkwardness even in a case where a cornering judgment is made while the vehicle is not in fact in a cornering state (e.g., in a case of entering the cruise range from the acceleration range due to overtaking on a free way or some other action).

The transmission control device according to the present embodiment is configured to set a displacement-factor holding time Th and a displacement-factor setting-back time Tm during which to hold a modified shift-up table, when the modified shift-up table is to be set back to the reference shift-up table. Accordingly, the control on the setting back to the reference shift-up table is performed smoothly.

The modified shift-up table generated upon detection of the transition to a cornering state is set back to the reference shift-up table by spending the displacement-factor holding time Th and the displacement-factor setting-back time Tm. Specifically, the modified shift-up table is modified continuously by holding the displacement factor K as it is until the displacement-factor holding time Th elapses and then by reducing continuously the displacement factor K to zero by spending the displacement-factor setting-back time Tm.

However, a shift-up still occurs if a shift-up condition is met while counting the displacement-factor setting-back time Tm, and the modified shift-up table is instantly set back to the reference shift-up table. This may lead to successive shift-up operations because, in this event, the shift-up suppression control is canceled due to the first shift-up, and this in turn satisfies the shift-up condition at the next gear position. For this reason, the present embodiment employs a technique that prevents successive shift-ups by setting a new displacement-factor holding time Th in a case of a shift-up during the control on the setting back to the reference shift-up table.

FIG. 18 is a time chart showing a flow of the control to set the modified shift-up table back to the reference shift-up table. At time t0, the displacement factor K, i.e., the modified degree of the modified shift-up tale is K1. At time t10, the displacement-factor setting-back control using the displacement-factor setting-back time Tm starts after the elapse of the displacement-factor holding time Th. In the illustrated example, however, at time t20, which is after the elapse of time Tm1 since the time t10, the shift-up condition to the fourth gear is met due to an increase in vehicle speed and thus a shift-up occurs. In this event, the transition of the displacement factor K is suspended and a new holding time Th2 is set, instead of instantly using the reference shift-up table for the fourth gear. Accordingly, successive shift-ups are prevented from occurring. This is a feature of the present embodiment. As of the time t20, a fourth-gear modified shift-up table taking over the displacement factor K2 is used.

At time t30, the displacement-factor setting-back control using a displacement-factor setting-back time Tm2 starts after the elapse of the holding time Th2 set previously. In the illustrated example, however, at time t40, which is after the elapse of the time Tm2 since the time t20, the shift-up condition to the fifth gear is met due to an increase in vehicle speed and a shift-up occurs. In this event too, the transition of the displacement factor K is suspended and a new holding time Th3 is set. Accordingly, as of the time t40, a fifth-gear modified shift-up table taking over the displacement factor K3 is used.

Then, at time t50, the setting-back control using a displacement-factor setting-back time Tm3 starts after the elapse of the holding time Th3 set previously. At time t60, which is after the elapse of the time Tm3, the fifth-gear modified shift-up table is set back to a fifth-gear reference shift-up table (K=0), and then the series of controls ends.

As has been described hereinabove, the transmission control device according to the embodiment of the present invention includes cornering-state judgment maps each using the throttle opening and the vehicle speed as parameters to define the running state of the vehicle, and judges whether the vehicle has transitioned to a cornering state on the basis of the relationship between the throttle opening and the vehicle speed. Accordingly, it is possible to estimate the transition of the vehicle to a cornering state without additionally using a special sensor. Moreover, the transmission control device according to the embodiment of the present invention employs the following two techniques: 1. A shift-up is suppressed during cornering by changing the gear-shift map only for a predetermined period from the time of the occurrence of the transition to the cornering state; and 2. The vehicle speed at the start of cornering is used as a reference to the amount of modification to be made on the modified shift-up table, and an up-shift can occur upon increase in vehicle speed by a predetermined amount from the reference vehicle speed. By these techniques, it is possible to achieve up-shift suppression control which is effective during cornering, and also to perform gear-shift control without awkwardness even in a case of a running pattern involving entering "the cruise range from the acceleration range" without transition to a cornering state.

The settings and the like of data maps, such as the cornering-state judgment map, the reference shift-up table, the maximum shift-up table, the displacement-factor holding time map, and the displacement-factor setting-back-time map, are not limited to those in the above embodiment, and various changes can be made thereto. Besides motorcycles, the transmission control device according to the embodiment of the present invention is applicable to various types of vehicles such as three-/four-wheeled vehicles.

According to the embodiment of the invention, a transmission control device includes: a cornering-state judging part judging whether its vehicle has transitioned to a cornering state from a normal running state; a modified shift-up table generating part generating a modified shift-up table when the vehicle is judged to have transitioned to a cornering state, the modified shift-up table making a shift-up more difficult to occur than a reference shift-up table does; and a gear-shift controlling part performing gear-shift control by using the reference shift-up table during the normal running state, whereas suppressing a gear shift by using the modified shift-up table instead of the reference shift-up table when the vehicle is judged to have transitioned to a cornering state. Thus, without using a lean angle sensor or the like, the transition of the vehicle to a cornering state can be detected and a shift-up during cornering can be suppressed. Accordingly, it is possible to prevent large torque fluctuations from being produced in the drive wheel during cornering. In addition, unlike a configuration which, for example, inhibits a shift-up for a predetermined period of time upon detection of the transition to a cornering state, a shift-up is allowed to occur even after the start of the shift-up suppression control if the vehicle exceeds a predetermined vehicle speed. This prevents maintaining a shift-up inhibition state until a predetermined period of time elapses against the rider's will. Accordingly, the gear-shift control can be continued without causing awkwardness even in a case where a cornering judgment is made while the vehicle is not in fact in a cornering state.

According to the embodiment of the invention, the transmission control device includes: a cornering-state judgment map in which a running state of the vehicle is divided into an acceleration range, a cruise range, a deceleration range, and a throttle-off range by using a throttle opening and the vehicle speed as parameters, wherein the cornering-state judging part judges on the basis of the information on the throttle opening and the vehicle speed that the vehicle has transitioned to a cornering state from the normal running state, when the running state of the vehicle enters the cruise range from the acceleration range or when the running state of the vehicle enters the cruise range from the deceleration range. Accordingly, it is possible to detect the transition to a cornering state by use of only the throttle opening and the vehicle speed, which are parameters required in general automatic transmission control.

According to the embodiment of the invention, in the transmission control device, the reference shift-up table, a maximum shift-up table, and the cornering-state judgment map are each provided for each of gear positions of the automatic transmission. Accordingly, it is possible to make the cornering-state judgment and to generate the modified shift-up table for each gear position.

According to the embodiment of the invention, in the transmission control device, the modified shift-up table generating part includes the reference shift-up table and a maximum shift-up table in which a shift-up vehicle speed at a throttle opening is set to be higher than that at the same throttle opening in the reference shift-up table, and the modified shift-up table is formed between the reference shift-up table and the maximum shift-up table in accordance with a displacement factor calculated in accordance with the vehicle speed during cornering, the displacement factor being set to zero when the modified shift-up table is identical to the reference shift-up table and being set to one when the modified shift-up table is identical to the maximum shift-up table. Thus, the modified shift-up table can be easily generated in accordance with the displacement factor K calculated to be within the range of $0<K<1$. Accordingly, it is possible to perform shift-up suppression control according to various cornering states.

According to the embodiment of the invention, in the transmission control device, the gear-shift controlling part is configured to immediately start the gear-shift control using the modified shift-up table when the vehicle is judged to have transitioned to a cornering state, and then to set the modified shift-up table back to the reference shift-up table by continuously modifying the modified shift-up table. Accordingly, it is possible to perform, smoothly, control to set the modified shift-up table back to the reference shift-up table.

According to the embodiment of the invention, the transmission control device includes: a displacement-factor holding-time setting part setting a displacement-factor holding time by using a displacement-factor holding-time map, the displacement-factor holding time being a time during which to hold the modified shift-up table generated when the vehicle is judged to have transitioned to a cornering state; and a displacement-factor setting-back-time setting part setting a displacement-factor setting-back time by using a displacement-factor setting-back-time map, the displacement-factor setting-back time being a time required for the modified shift-up table to be continuously modified to the reference shift-up table after elapse of the displacement-factor holding time. Thus, the displacement-factor holding time and the displacement-factor setting-back time can be set in accordance with various cornering states. Accordingly, it is possible to perform, more smoothly, the control to set the modified shift-up table back to the reference shift-up table.

According to the embodiment of the invention, in the transmission control device, the displacement-factor holding-time map and the displacement-factor setting-back-time map are each set for each gear position of the automatic transmission. Accordingly, it is possible to set the displacement-factor holding time and the displacement-factor setting-back time for each gear position.

According to the embodiment of the invention, the transmission control device is configured to perform transmission control while selecting any one of a D mode being suitable for cruising and the like and an S mode having a vehicle speed for gear shift set higher than that in the D mode, upon detection of transition of the vehicle to a cornering state while the D mode is selected, the modified shift-up table is formed based on a D-mode reference shift-up table and a D-mode maximum shift-up table and, at the same time, the displacement-factor holding time and the displacement-factor setting-back time are derived respectively from D-mode maps, and upon detection of transition of the vehicle to a cornering state while the S mode is selected, the modified shift-up table is formed based on an S-mode reference shift-up table and an S-mode maximum shift-up table and, at the same time, the displacement-factor holding time and the displacement-factor setting-back time are derived respectively from S-mode maps. Accordingly, it is possible to set the displacement-factor holding time and the displacement-factor setting-back time that are suitable for the D or S mode, allowing even smoother gear-shift control.

Obviously, numerous modifications and variations of the present invention are possible in light of the above teachings. It is therefore to be understood that within the scope of the appended claims, the invention may be practiced otherwise than as specifically described herein.

What is claimed is:

1. A transmission control apparatus for an automatic transmission to change a shift position automatically, the transmission control apparatus comprising:
   a cornering-state judging device configured to judge whether a vehicle has transitioned to a cornering state from a normal running state;
   a modified shift-up table generator configured to generate a modified shift-up table when the vehicle is judged to have transitioned to the cornering state, the modified shift-up table making a shift-up more difficult to occur than a reference shift-up table does;
   a gear-shift controller configured to perform gear-shift control by using the reference shift-up table during the normal running state, and configured to suppress a gear shift by using the modified shift-up table instead of the reference shift-up table when the vehicle is judged to have transitioned to the cornering state; and
   a cornering-state judgment map in which a running state of the vehicle is divided into an acceleration range, a cruise range, a deceleration range, and a throttle-off range by using a throttle opening and a vehicle speed as parameters,
   wherein the cornering-state judging device is configured to judge based on information on the throttle opening and the vehicle speed that the vehicle has transitioned to the cornering state from the normal running state, when the running state of the vehicle enters the cruise range from the acceleration range or when the running state of the vehicle enters the cruise range from the deceleration range.

2. The transmission control apparatus according to claim 1, wherein the reference shift-up table and the cornering-state judgment map are each provided for each of gear positions of the automatic transmission.

3. The transmission control apparatus according to claim 1, wherein the modified shift-up table generator includes the reference shift-up table and a maximum shift-up table in which a shift-up vehicle speed at a throttle opening is set to be higher than a shift-up vehicle speed at the same throttle opening in the reference shift-up table, and
   wherein the modified shift-up table is formed between the reference shift-up table and the maximum shift-up table in accordance with a displacement factor calculated in accordance with the vehicle speed during cornering, the displacement factor being set to zero when the modified shift-up table is identical to the reference shift-up table and being set to one when the modified shift-up table is identical to the maximum shift-up table.

4. The transmission control apparatus according to claim 2, wherein the modified shift-up table generator includes the reference shift-up table and a maximum shift-up table in which a shift-up vehicle speed at a throttle opening is set to be higher than a shift-up vehicle speed at the same throttle opening in the reference shift-up table, and
   wherein the modified shift-up table is formed between the reference shift-up table and the maximum shift-up table in accordance with a displacement factor calculated in accordance with the vehicle speed during cornering, the displacement factor being set to zero when the modified shift-up table is identical to the reference shift-up table and being set to one when the modified shift-up table is identical to the maximum shift-up table.

5. The transmission control apparatus according to claim 1, wherein the gear-shift controller is configured to immediately start the gear-shift control using the modified shift-up table when the vehicle is judged to have transitioned to a cornering state, and then to set the modified shift-up table back to the reference shift-up table by continuously modifying the modified shift-up table.

6. The transmission control apparatus according to claim 2, wherein the gear-shift controller is configured to immediately start the gear-shift control using the modified shift-up table when the vehicle is judged to have transitioned to a cornering state, and then to set the modified shift-up table back to the reference shift-up table by continuously modifying the modified shift-up table.

7. The transmission control apparatus according to claim 3, wherein the gear-shift controller is configured to immediately start the gear-shift control using the modified shift-up table when the vehicle is judged to have transitioned to a cornering state, and then to set the modified shift-up table back to the reference shift-up table by continuously modifying the modified shift-up table.

8. The transmission control apparatus according to claim 4, wherein the gear-shift controller is configured to immediately start the gear-shift control using the modified shift-up table when the vehicle is judged to have transitioned to a cornering state, and then to set the modified shift-up table back to the reference shift-up table by continuously modifying the modified shift-up table.

9. The transmission control apparatus according to claim 5, comprising:
   a displacement-factor holding-time setting device to set a displacement-factor holding time by using a displacement-factor holding-time map, the displacement-factor holding time being a time during which to hold the modified shift-up table generated when the vehicle is judged to have transitioned to a cornering state; and
   a displacement-factor setting-back-time setting device to set a displacement-factor setting-back time by using a displacement-factor setting-back-time map, the displacement-factor setting-back time being a time required for the modified shift-up table to be continuously modified to the reference shift-up table after elapse of the displacement-factor holding time.

10. The transmission control apparatus according to claim 6, comprising:
   a displacement-factor holding-time setting device to set a displacement-factor holding time by using a displacement-factor holding-time map, the displacement-factor holding time being a time during which to hold the modified shift-up table generated when the vehicle is judged to have transitioned to a cornering state; and
   a displacement-factor setting-back-time setting device to set a displacement-factor setting-back time by using a displacement-factor setting-back-time map, the displacement-factor setting-back time being a time required for the modified shift-up table to be continuously modified to the reference shift-up table after elapse of the displacement-factor holding time.

11. The transmission control apparatus according to claim 7, comprising:
a displacement-factor holding-time setting device to set a displacement-factor holding time by using a displacement-factor holding-time map, the displacement-factor holding time being a time during which to hold the modified shift-up table generated when the vehicle is judged to have transitioned to a cornering state; and
a displacement-factor setting-back-time setting device to set a displacement-factor setting-back time by using a displacement-factor setting-back-time map, the displacement-factor setting-back time being a time required for the modified shift-up table to be continuously modified to the reference shift-up table after elapse of the displacement-factor holding time.

12. The transmission control apparatus according to claim 8, comprising:
a displacement-factor holding-time setting device to set a displacement-factor holding time by using a displacement-factor holding-time map, the displacement-factor holding time being a time during which to hold the modified shift-up table generated when the vehicle is judged to have transitioned to a cornering state; and
a displacement-factor setting-back-time setting device to set a displacement-factor setting-back time by using a displacement-factor setting-back-time map, the displacement-factor setting-back time being a time required for the modified shift-up table to be continuously modified to the reference shift-up table after elapse of the displacement-factor holding time.

13. A transmission control apparatus for an automatic transmission to change a shift position automatically, the transmission control apparatus comprising:
a cornering-state judging device configured to judge whether a vehicle has transitioned to a cornering state from a normal running state;
a modified shift-up table generator configured to generate a modified shift-up table when the vehicle is judged to have transitioned to the cornering state, the modified shift-up table making a shift-up more difficult to occur than a reference shift-up table does;
a gear-shift controller configured to perform gear-shift control by using the reference shift-up table during the normal running state, and configured to suppress a gear shift by using the modified shift-up table instead of the reference shift-up table when the vehicle is judged to have transitioned to the cornering state;
a displacement-factor holding-time setting device to set a displacement-factor holding time by using a displacement-factor holding-time map, the displacement-factor holding time being a time during which to hold the modified shift-up table generated when the vehicle is judged to have transitioned to a cornering state; and
a displacement-factor setting-back-time setting device to set a displacement-factor setting-back time by using a displacement-factor setting-back-time map, the displacement-factor setting-back time being a time required for the modified shift-up table to be continuously modified to the reference shift-up table after elapse of the displacement-factor holding time,
wherein the gear-shift controller is configured to immediately start the gear-shift control using the modified shift-up table when the vehicle is judged to have transitioned to a cornering state, and then to set the modified shift-up table back to the reference shift-up table by continuously modifying the modified shift-up table.

14. The transmission control apparatus according to claim 13,
wherein the displacement-factor holding-time map and the displacement-factor setting-back-time map are each set for each gear position of the automatic transmission.

15. The transmission control apparatus according to claim 14,
wherein the transmission control apparatus is configured to perform automatic transmission control while selecting any one of a D mode being suitable for cruising and an S mode having a vehicle speed for gear shift set higher than a vehicle speed for gear shift set in the D mode,
wherein upon detection of transition of the vehicle to the cornering state while the D mode is selected, the modified shift-up table is formed based on a D-mode reference shift-up table and a D-mode maximum shift-up table and the displacement-factor holding time and the displacement-factor setting-back time are derived respectively from D-mode maps, and
wherein upon detection of transition of the vehicle to the cornering state while the S mode is selected, the modified shift-up table is formed based on an S-mode reference shift-up table and a S-mode maximum shift-up table and the displacement-factor holding time and the displacement-factor setting-back time are derived respectively from S-mode maps.

\* \* \* \* \*